(12) United States Patent
Matsui et al.

(10) Patent No.: US 9,635,729 B2
(45) Date of Patent: Apr. 25, 2017

(54) ILLUMINATION DEVICE AND ILLUMINATION SYSTEM AND MOBILE BODY INCLUDING THE SAME

(71) Applicant: Panasonic Intellectual Property Management Co., Ltd., Osaka (JP)

(72) Inventors: Nobuyuki Matsui, Osaka (JP); Youji Tachino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/259,827

(22) Filed: Sep. 8, 2016

(65) Prior Publication Data
US 2017/0079109 A1  Mar. 16, 2017

(30) Foreign Application Priority Data

Sep. 10, 2015 (JP) .................... 2015-178866
Mar. 7, 2016 (JP) .................... 2016-043714

(51) Int. Cl.
*H05B 37/02* (2006.01)
*H05B 33/08* (2006.01)
(Continued)

(52) U.S. Cl.
CPC ..... *H05B 33/0869* (2013.01); *H05B 37/0281* (2013.01); *B60Q 3/004* (2013.01);
(Continued)

(58) Field of Classification Search
CPC .. H05B 37/02; H05B 37/029; H05B 37/0227; H05B 37/0245; H05B 33/0842;
(Continued)

(56) References Cited

U.S. PATENT DOCUMENTS 8,100,552 B2 * 1/2012 Spero ................... B60Q 1/04
362/227
8,492,995 B2 * 7/2013 Maxik ................ H05B 33/0869
315/291
(Continued)

FOREIGN PATENT DOCUMENTS

JP H05-21168 A 1/1993
JP 2006-202602 A 8/2006
(Continued)

*Primary Examiner* — Haissa Philogene
(74) *Attorney, Agent, or Firm* — McDermott Will & Emery LLP

(57) ABSTRACT

An illumination device includes a first light source and a second light source, a sensor, and a controller. The controller repeats a plurality of operation cycles, one operation cycle being a set of a first period in which only a detection target light source is caused to emit light and a second period in which the first light source and the second light source are caused to emit light. The sensor outputs detection values of detected light amounts in the first period. The controller controls the light source such that light amount of the light source fall in a target range, based on a detection result that corresponds to a value corresponding to the detection values of the light amount detected a predetermined number of times.

16 Claims, 17 Drawing Sheets

(51) Int. Cl.
    *F21Y 115/10*     (2016.01)
    *F21Y 103/10*     (2016.01)
    *F21V 17/12*     (2006.01)
    *B60Q 3/02*     (2006.01)
    *B60Q 3/00*     (2017.01)

(52) U.S. Cl.
    CPC .......... *B60Q 3/0203* (2013.01); *B60Q 3/0253* (2013.01); *F21V 17/12* (2013.01); *F21Y 2103/10* (2016.08); *F21Y 2115/10* (2016.08)

(58) Field of Classification Search
    CPC ............ H05B 33/0869; H05B 33/0872; H05B 33/086; Y02B 20/42; Y02B 20/46; F21Y 2113/00
    USPC ............... 315/153, 291, 297, 307, 312, 360; 362/227, 249.02, 276; 250/205
    See application file for complete search history.

(56) References Cited

U.S. PATENT DOCUMENTS

| | | | |
|---|---|---|---|
| 8,772,691 B2 * | 7/2014 | May | G01J 3/0254 |
| | | | 250/205 |
| 8,779,669 B2 * | 7/2014 | Ramer | H05B 37/0209 |
| | | | 315/153 |
| 2008/0088244 A1 | 4/2008 | Morishita | |

FOREIGN PATENT DOCUMENTS

| | | |
|---|---|---|
| JP | 2008-210887 A | 9/2008 |
| JP | 2009-206186 A | 9/2009 |
| JP | 2012-119089 A | 6/2012 |

* cited by examiner

ILLUMINATION DEVICE AND ILLUMINATION SYSTEM AND MOBILE BODY INCLUDING THE SAME

CROSS-REFERENCE TO RELATED APPLICATION

This application is based upon and claims the benefit of priority of Japanese Patent Application No. 2015-178866, filed on Sep. 10,2015 and Japanese Patent Application No. 2016-043714, filed on Mar. 07,2016, the entire contents of which are incorporated herein by reference.

TECHNICAL FIELD

This disclosure relates to an illumination device and an illumination system and a mobile body including the same.

BACKGROUND ART

Nowadays, illumination devices that detect a light amount (light intensity) of a light source with a sensor and control lighting of the light source based on a detection result of the sensor are being developed.

A configuration in which a plurality of LED (Light Emitting Diode) chips, a light detection element serving as a sensor, a plurality of switching elements, and a controller are included, for example, has been known as a configuration that can be used in this type of illumination device (refer to Document 1 (JP 2009-206186A), for example).

The light detection element in Document 1 detects light that is emitted from the plurality of LED chips having different emission colors. The switching elements are respectively inserted in power supply paths to the corresponding LED chips. The controller separately adjusts light outputs of the plurality of LED chips by performing PWM control on the switching elements based on an output of the light detection element. The controller generates PWM signals such that mixed color periods in which all of the LED chips are lit and monitoring periods in which only one LED chip that is a monitoring target of the light detection element is lit alternately appear in time series.

In the configuration in Document 1, light from each of the LED chips of respective emission colors is accurately detected by successively switching LED chips that are lit as the monitoring target, and light outputs of the LED chips are adjusted.

Incidentally, a configuration of the illumination device in which variation in light output is further reduced is required, the variation is not sufficiently reduced by using the configuration in Document 1 described above, and as a result, further improvement is required.

SUMMARY

An object of the present technology is to provide an illumination device in which variation in light output is further reduced, and an illumination system and a mobile body including the same.

An illumination device according to one aspect of the present disclosure includes a light source portion, a sensor, and a controller. The sensor is configured to detect a light amount of the light source portion. The controller is configured to control lighting of the light source portion. The light source portion includes a first light source and a second light source. The controller is configured to repeat a plurality of operation cycles, one operation cycle being a set of a first period and a second period. The controller is configured to control the lighting of the light source portion such that composite light generated by light from the first light source and light from the second light source has a same light output over the plurality of operation cycles. In the first period, only either one of the first light source or the second light source, which is a detection target light source and whose light amount is to be detected by the sensor, is caused to emit light. In the second period, the first light source and the second light source are caused to emit light. The sensor is configured to output detection values of a light amount of the first light source in the first period of a first operation cycle in the plurality of operation cycles and a light amount of the second light source in the first period of a second operation cycle in the plurality of operation cycles, the second operation cycle being different from the first operation cycle that are separately detected. The controller is further configured to separately control lighting of the first light source and light of the second light source such that a light amount of the detection target light source falls in a target range based on a detection result. The detection result corresponds to a value corresponding to the detection values of the light amount detected a predetermined number of times.

An illumination system according to one aspect of the present disclosure includes at least one illumination device described above and a control device. The control device is configured to control driving of the illumination device. The at least one illumination device further includes a communicator configured to communicate with the control device. The communicator is configured to transmit a detection value to the control device on a request from the control device.

A mobile body according to one aspect of the present disclosure includes the illumination system described above and a body. The illumination system is mounted to the body.

BRIEF DESCRIPTION OF DRAWINGS

Preferable embodiments according to the present invention will be described below in more detail. Other features and advantages of the present invention will be better understood with reference to the following detailed description and the attached drawings.

DESCRIPTION OF EMBODIMENTS

The present embodiments relate to illumination devices and illumination systems and mobile bodies including the same, and specifically relate to an illumination device configured to detect a light amount of a light source with a sensor and control lighting of the light source based on a detection result by the sensor, and an illumination system and a mobile body including the same.

Embodiment 1

Hereinafter, an illumination device 10 of the present embodiment will be described with reference to FIGS. 1 to 7. An illumination system 20 according to the present embodiment will be described with reference to FIGS. 1 and 3, and a mobile body 30 will be described with reference to FIG. 8. Note that, in the diagrams, the same reference signs are given to the same members and redundant descriptions will be omitted. The sizes of the members and positional relationships between the members shown in the diagrams may be described in an emphasized manner in order to clarify the description. In the following description, each element that constitutes the present embodiment may be realized in such a manner that two or more elements are configured by one member and the one member acts as the two or more elements, or a function of one member is shared and realized by two or more members.

Figure 1:
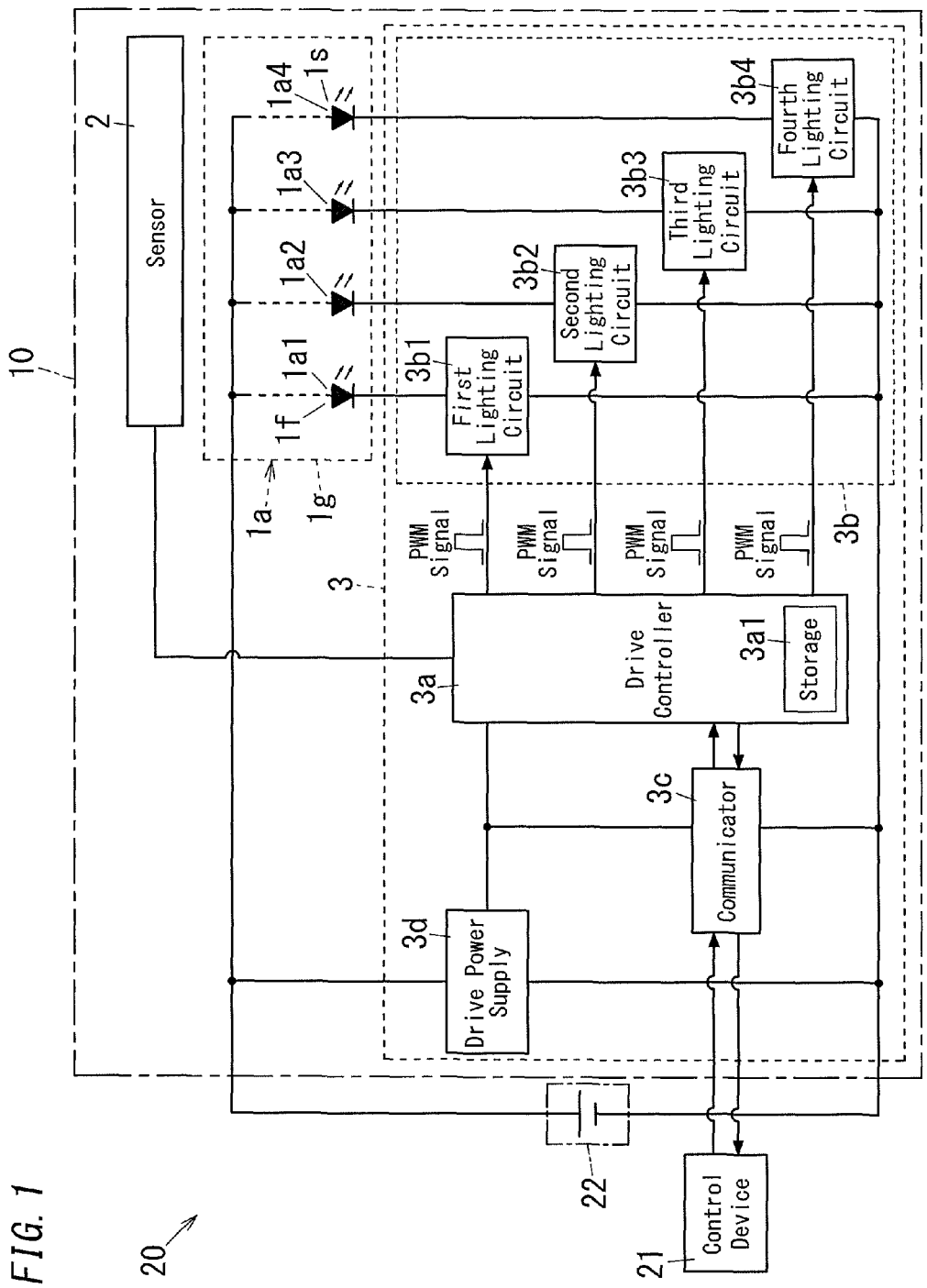
FIG. 1 is a circuit configuration diagram illustrating an illumination system including an illumination device of Embodiment 1.

The illumination device 10 of the present embodiment includes a light source portion 1a, a sensor 2, and a controller 3, as shown in FIG. 1. The sensor 2 is configured to detect a light amount of the light source portion 1a. The controller 3 is configured to control lighting of the light source portion 1a. The light source portion 1a includes a first light source 1f and a second light source 1s. The light source portion 1a includes two or more types of light sources having different emission colors. The two or more types of light sources include at least the first light source 1f and the second light source 1s. In FIG. 1, a red LED 1a1 that emits red light, a green LED 1a2 that emits green light, a blue LED 1a3 that emits blue light, and a white LED 1a4 that emits white light are illustrated as the two or more types of light sources having different emission colors. In other words, the first light source 1f is the red LED 1a1, and the second light source 1s is the white LED 1a4.

The controller 3 is configured to repeat a plurality of operation cycles, one operation cycle being a set of a first period and a second period, and control lighting of the light source portion 1a such that composite light of light of the first light source 1f and light of the second light source 1s has the same light output (light amount) over the plurality of operation cycles. Here, the composite light refers to light in which light of the first light source 1f and light of the second light source 1s are combined and that is in a substantially uniform state to the human eye. That is, it suffices that the composite light is light in a substantially uniform state to the human eye in a period in which the first period and the second period are combined.

In the first period, only either one of the first light source 1f or the second light source 1s, which is a detection target light source whose light amount is to be detected by the sensor 2, is caused to emit light. In other words, in the illumination device 10 of the present embodiment, the first period is a single color period in which only one type of light source among the two or more types of light sources is caused to emit light, as shown in FIG. 2.

In the second period, the first light source 1f and the second light source 1s are caused to emit light. In other words, in the illumination device 10 of the present embodiment, the second period is a mixed color period in which the two or more types of light sources are caused to emit light. That is, the controller 3 controls lighting of the two or more types of light sources such that mixed light of the two or more types of light has the same light color in each of the plurality of operation cycles.

Figure 2:
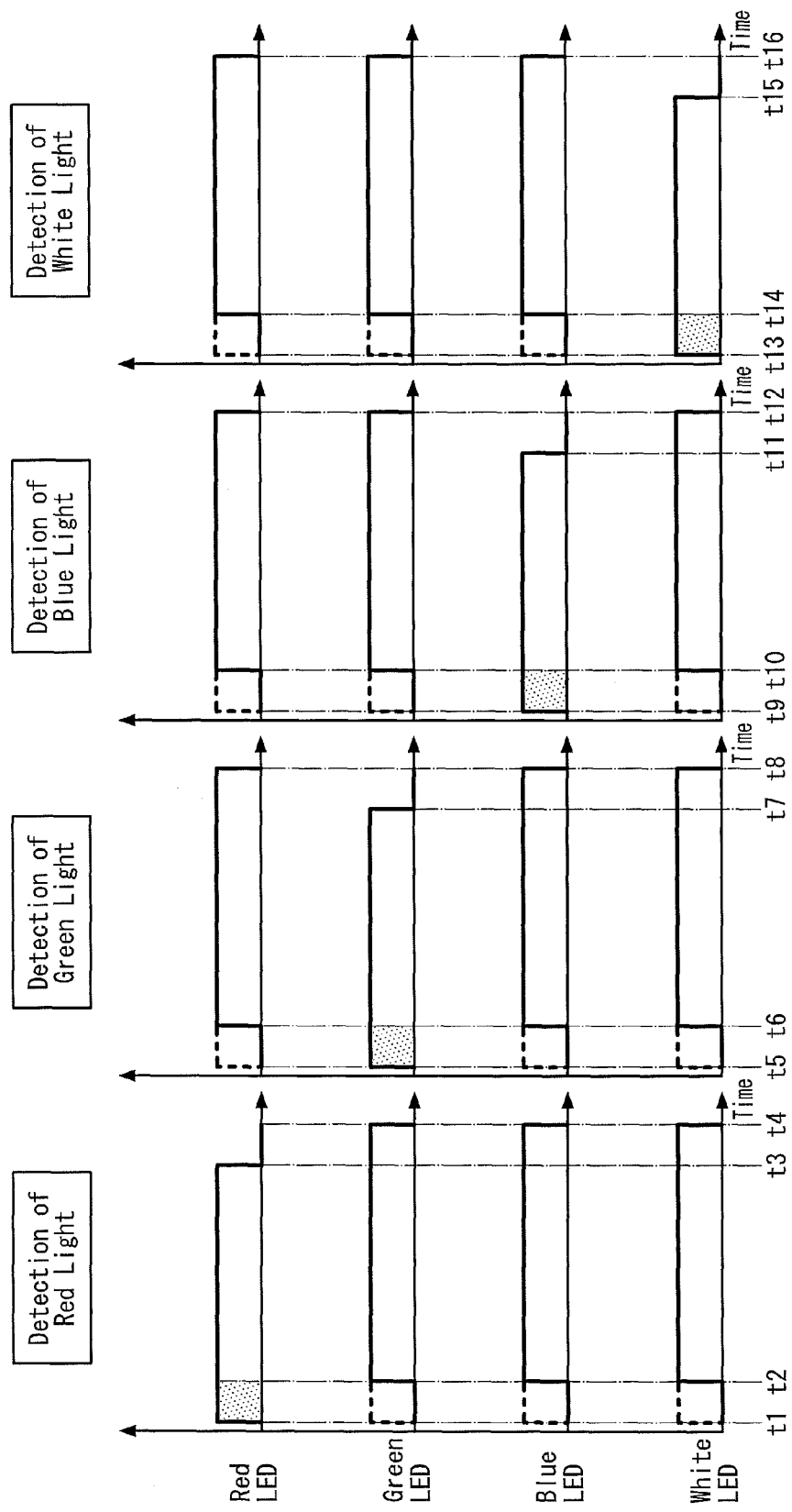
FIG. 2 is a graph for describing a first period and a second period in Embodiment 1.

In FIG. 2, one operation cycle is illustrated as a period from time t1 to time t4, a period from time t1 to time t2 is the single color period in which only the red LED 1a1 is caused to emit light, and a period from time t2 to time t4 is the mixed color period. Hereinafter, a single color period in which only the red LED 1a1 is caused to emit light is also referred to as a first single color period T1. In FIG. 2, an illustration is given in which, in the case of detecting red light, for example, one type of light source is the red LED 1a1, and the two or more types of light sources are the red LED 1a1, the green LED 1a2, the blue LED 1a3, and the white LED 1a4. Similarly, a period from time t5 to time t8 is one operation cycle, a period from time t5 to time t6 is a single color period in which only the green LED 1a2 is caused to emit light, and a period from time t6 to time t8 is the mixed color period. Hereinafter, a single color period in which only the green LED 1a2 is caused to emit light is also referred to as a second single color period T2. A period from time t9 to time t12 is one operation cycle, a period from time t9 to time t10 is the single color period in which only the blue LED 1a3 is caused to emit light, and a period from time t10 to time t12 is the mixed color period. Hereinafter, a single color period in which only the blue LED 1a3 is caused to emit light is also referred to as a third single color period T3. A period from time t13 to time t16 is one operation cycle, a period from time t13 to time t14 is the single color period in which only the white LED 1a4 is caused to emit light, and a period from time t14 to time t16 is the mixed color period. Hereinafter, a single color period in which only the white LED 1a4 is caused to emit light is also referred to as fourth single color period T4. In all of the operation cycles, the mixed light of light of the red LED 1a1, light of the green LED 1a2, light of the blue LED 1a3, and light of the white LED 1a4 is recognized as light having the same light color to the human eye because the one operation cycle, which includes both of the single color period and the mixed color period is very short term for the human eyes. Here, mixed light having the same light color refers to not only a case where the color of mixed light that is emitted from the illumination device 10 is completely the same, but also includes a case where the difference in light color cannot be substantially distinguished by a person.

Figure 3:
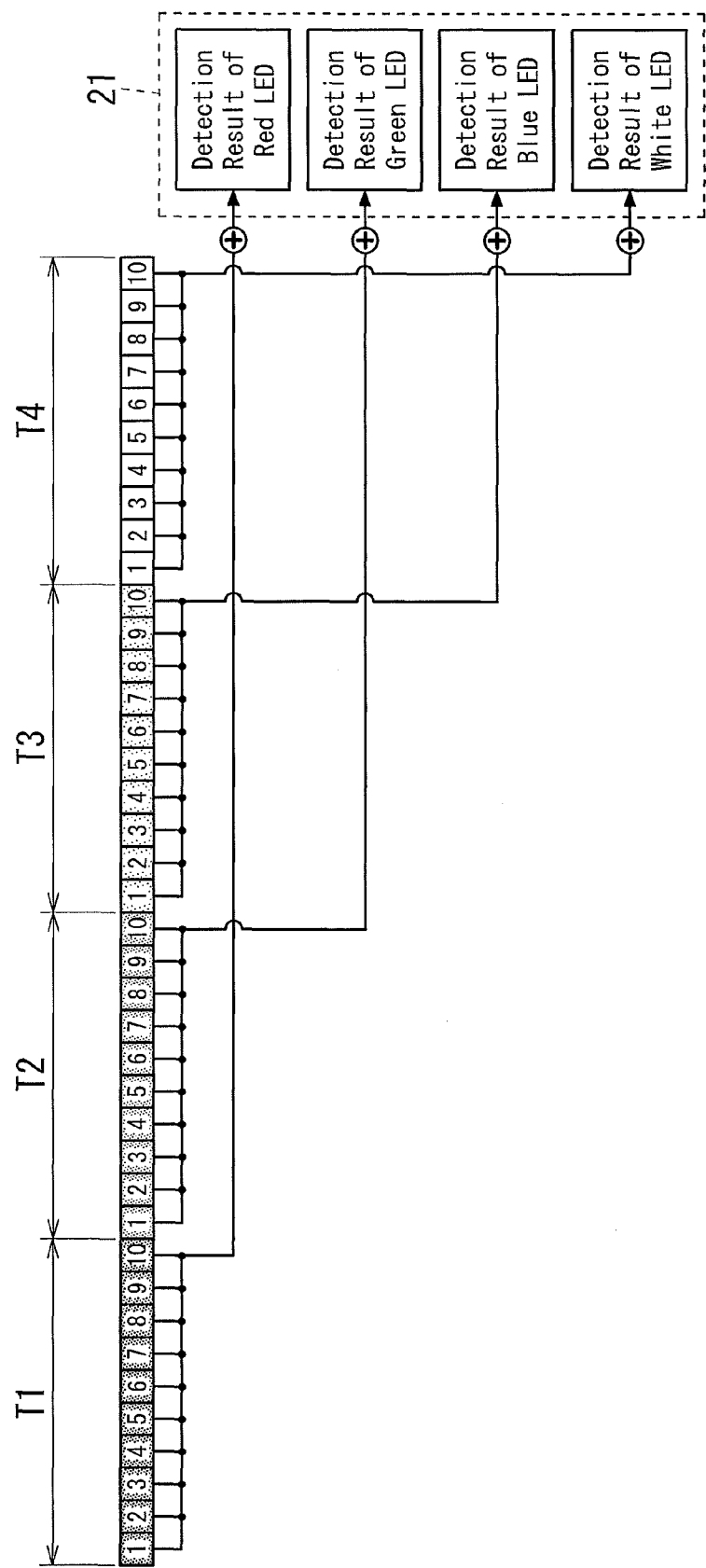
FIG. 3 is a diagram for describing a detection result in Embodiment 1.

The sensor 2 outputs detection values, namely a light amount of the first light source 1f in the first period of a first operation cycle in the plurality of operation cycles and a light amount of the second light source 1s in the first period of a second operation cycle in the plurality of operation cycles, the second operation cycle being different from the first operation cycle that are detected separately. That is, the sensor 2 outputs a detection value that is a detected light amount of one type of light source in the single color period. The controller 3 is furthermore configured to separately control lighting of the first light source 1f and lighting of the second light source 1s such that the light amounts of the detection target light sources fall in respective target ranges, based on the detection results by the sensor, as shown in FIG. 3. It can be said that the controller 3 separately controls lighting of two or more types of light sources such that the light amounts of the target light sources falls in the respective target ranges, based on the detection results. Each of the detection results is value, corresponding to detection values of the light amount detected a predetermined number of times.

In FIG. 3, an integrated value of detection values that are light amounts of red light detected ten times consecutively by the sensor 2 during the first single color period T1 in which only the red LED 1a1 is caused to emit light is the detection result of the red LED 1a1 in one operation cycle. In FIG. 3, the mixed color period in each of the operation cycles is omitted. Similarly, in FIG. 3, an integrated value of detection values that are light amounts of green light detected ten times consecutively by the sensor 2 during the second single color period T2 in which only the green LED 1a2 is caused to emit light is the detection result of the green LED 1a2 in one operation cycle. In FIG. 3, an integrated value of detection values that are light amounts of blue light detected ten times consecutively by the sensor 2 during the third single color period T3 in which only the blue LED 1a3 is caused to emit light is the detection result of the blue LED 1a3 in one operation cycle. In FIG. 3, an integrated value of detection values that are light amounts of white light detected ten times consecutively by the sensor 2 during the fourth single color period T4 in which only the white LED 1a4 is caused to emit light is the detection result of the white LED 1a4 in one operation cycle.

In the illumination device 10 of the present embodiment, variation in color can further be reduced with a configuration in which the controller 3 separately controls lighting of the light sources based on the detection results corresponding to detection values detected a predetermined number of times.

Hereinafter, a configuration of the illumination system 20 including the illumination device 10 of the present embodiment will be described based on FIG. 1. The illumination system 20 includes at least one illumination device 10 and a control device 21. In FIG. 1, one illumination device 10 is illustrated. The control device 21 is configured to control driving of the illumination device 10. The illumination device 10 further includes a communicator 3c configured to communicate with the control device 21. The communicator 3c is preferably configured to transmit the detection value to the control device 21 on a request from the control device 21.

In the illumination system 20 according to the present embodiment, the communicator 3c is preferably configured to transmit the detection value after the light source portion 1a has been lit for a predetermined period. In the illumination system 20, as a result of the communicator 3c performing transmission of the detection value after the light source portion 1a has been lit for a predetermined period, detection by the sensor 2 can be performed at an appropriate time when lighting of the light source portion 1a becomes stable. The illumination device 10 is electrically connected to an external power supply 22 so as to supply electric power to the light source portion 1a. The control device 21 includes a computation function in which a plurality of detection values that have been transmitted from the illumination device 10 are integrated. The control device 21 is configured to transmit, to the illumination device 10, the detection result that corresponds to an integrated value of a plurality of detection values detected by the sensor 2. The control device 21 includes a computer driven by an appropriate program, such as a personal computer.

Figure 5:
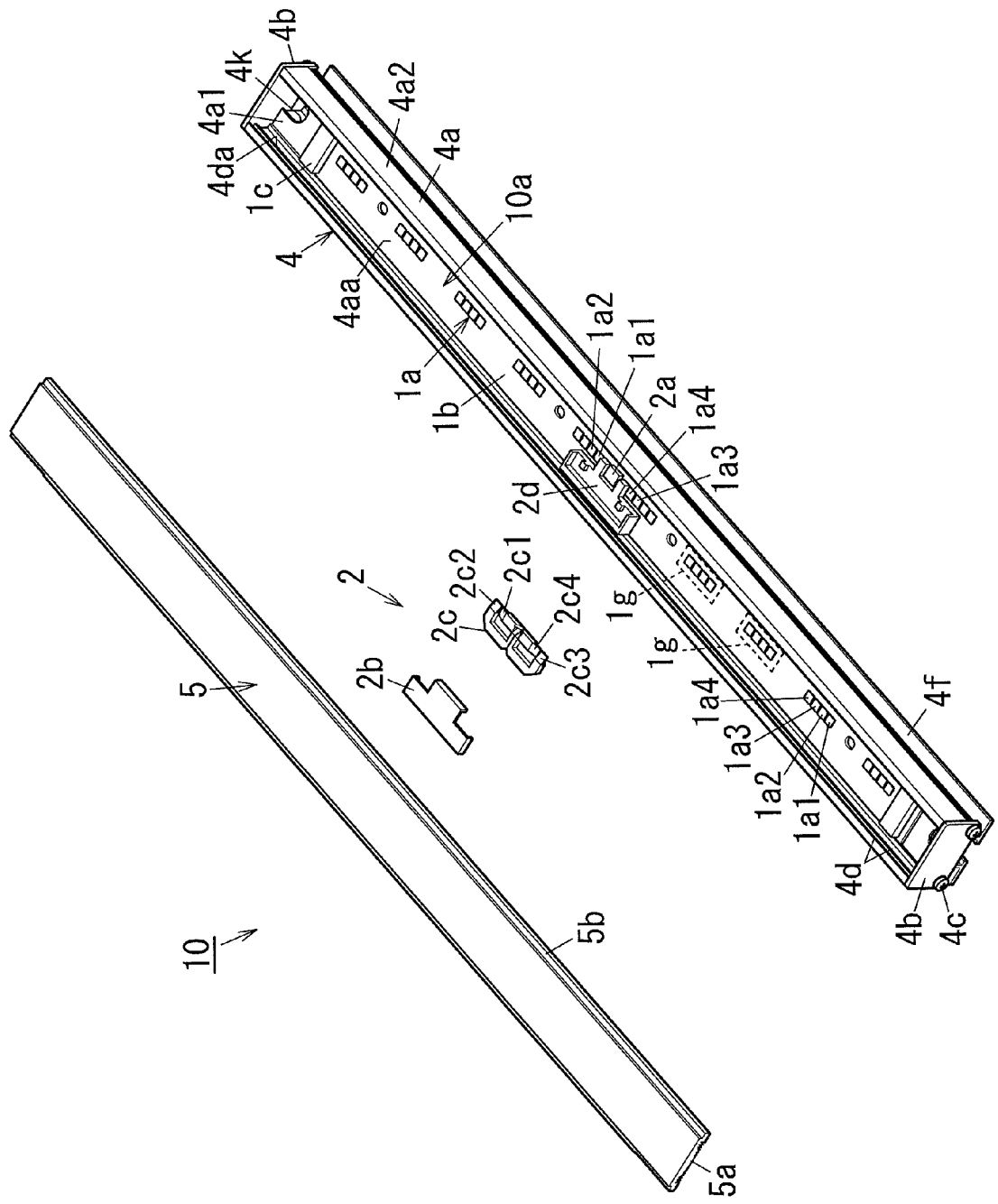
FIG. 5 is an exploded perspective view illustrating the illumination device of Embodiment 1.
Figure 6:
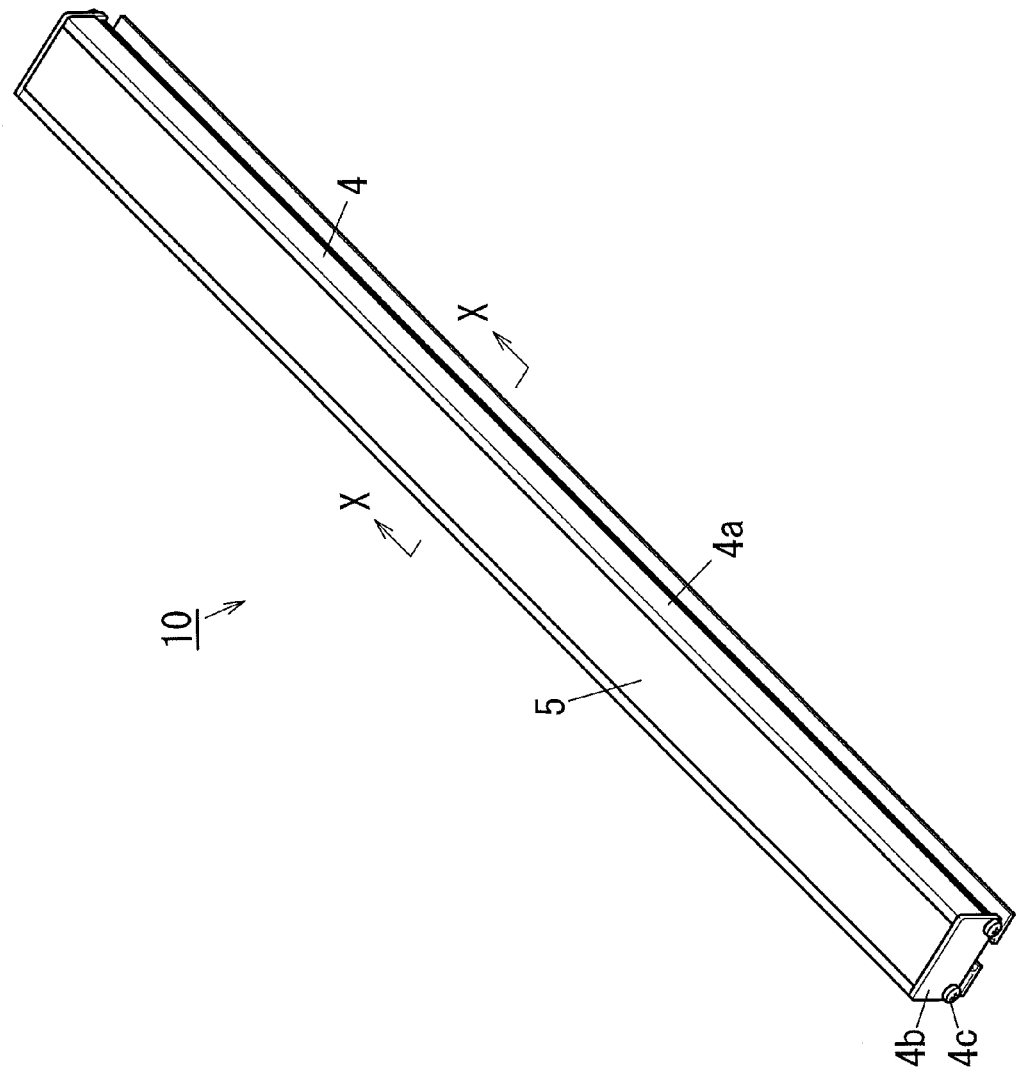
FIG. 6 is a perspective view illustrating the illumination device of Embodiment 1.
Figure 7:
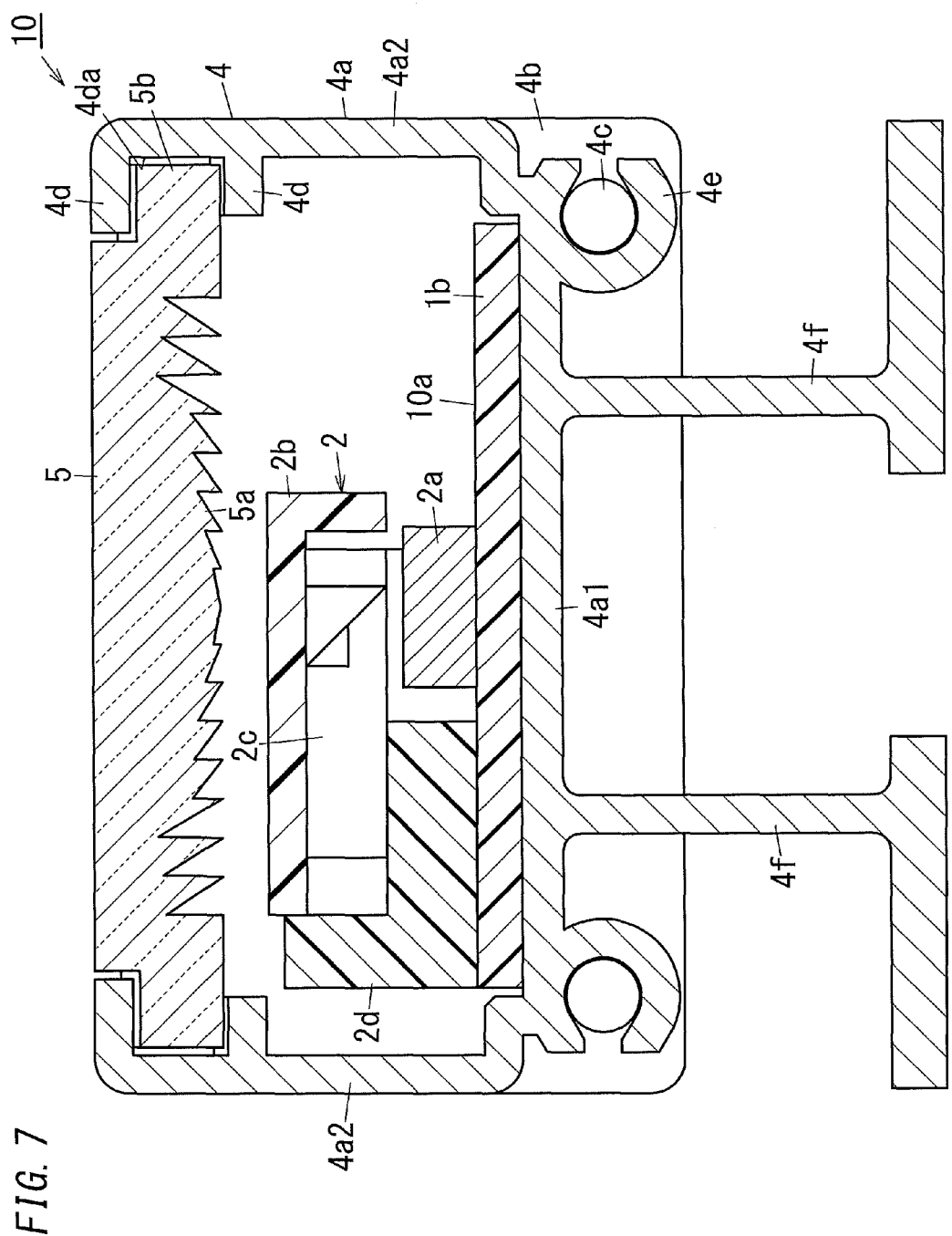
FIG. 7 is a cross-sectional view taken along line X-X in FIG. 6.

The illumination device 10 includes a casing 4 and an optical member 5, as shown in FIGS. 5 to 7, in addition to the light source portion 1a, the sensor 2, and the controller 3 shown in FIG. 1. The light source portion 1a, the sensor 2, and the controller 3 are integrally formed with a mounting substrate 1b, and constitute a portion of the light source unit 10a. An illustration of the controller 3 is omitted in FIGS. 5 to 7.

In the illumination device 10, a plurality of LED groups 1g are mounted on the elongated mounting substrate 1b, as shown in FIG. 5. In each of the plurality of LED groups 1g, four types of light sources having different emission colors are arranged together as a group. The LED group 1g includes one each of the red LED 1a1, the green LED 1a2, the blue LED 1a3, and the white LED 1a4, as the four types of light sources having different emission colors. The four types of LEDs are linearly arranged along a longitudinal direction of the mounting substrate 1b in a central portion in a short direction of the mounting substrate 1b. In one LED group 1g, the four types of LEDs are arranged at approximately equal intervals. The plurality of LED groups 1g are arranged at predetermined intervals. The arrangement of the plurality of LEDs is not limited to the configuration in which the plurality of LEDs are linearly arranged. The configuration may be such that the plurality of LEDs are arranged in a manner other than a linear arrangement such as an arrangement in which the four LEDs are arranged in a 2×2 matrix in each of the LED groups 1g.

The two or more types of light sources having different emission colors are not limited to the four types of the red LED 1a1, the green LED 1a2, the blue LED 1a3, and the white LED 1a4. The two or more types of light sources having different emission colors may include only three types of LEDs, namely a cyan LED that emits cyan light, a magenta LED that emits magenta light, and a yellow LED that emits yellow light.

Each LED may be configured to include an LED chip, a package in which a recess for housing the LED chip is provided, and a light transmitting sealing material that seals the recess, for example. Each LED may be a surface mount type light-emitting diode that includes an LED chip, a package, and a sealing material, or may be only a single LED chip, for example. In the illumination device 10, LEDs in the same color rank that have been sorted in advance are used as the LEDs having the same emission color so as to be able to emit light having substantially the same color with the same current. In the illumination device 10, LEDs in the same rank are used for each emission color so as to emit light of substantially the same color for each emission color in one illumination device 10. The light source is not limited to the configuration in which LEDs are used. The light source may be an organic EL element or a discharge lamp such as a fluorescent light instead of the LED.

The mounting substrate 1b has a rectangular flat plate external shape. A glass epoxy resin substrate is used for the mounting substrate 1b. The mounting substrate 1b is not limited to the glass epoxy resin substrate. The mounting substrate 1b may be a metal substrate in which wiring having a predetermined shape is provided via an insulating layer or the like. In the mounting substrate 1b, LEDs of the same type having the same emission color are electrically connected in series using wiring having a predetermined shape such that groups of LEDs that each emit light having the same emission color are lit separately. A connector 1c is provided in the mounting substrate 1b such that power is separately supplied to each of the groups of LEDs that each emit light having the same emission color. The number of LEDs having the same emission color may be one, or two or more.

The sensor 2 is configured to detect a light amount for each of the LEDs having different emission colors. The sensor 2 is provided in the mounting substrate 1b. The sensor 2 includes a sensor element 2a, a first cover 2d, a light guide member 2c, and a second cover 2b, as shown in FIGS. 5 and 7.

The sensor element 2a is mounted in the mounting substrate 1b. The sensor element 2a includes a photodiode including an optical filter. The sensor element 2a includes at least three photodiodes. The three photodiodes respectively include optical filters that are different from each other. The optical filters respectively allow beams of light having colors that are different from each other to pass through. The different optical filters respectively allow red light, green light, and blue light to pass through selectively.

The sensor element 2a can detect light amounts of the respective light sources having different emission colors by using the three photodiodes respectively corresponding to the optical filters of respective colors. The sensor element 2a is configured to convert light that is emitted from each of the light sources to an electrical signal, and output the converted electrical signal. The sensor element 2a is sensitive to red light, green light, and blue light, and outputs the detection values with 16-bit digital values for respective colors. The sensor element 2a can output detection values of the light amount of red light, the light amount of green light, and the light amount of blue light as serial data. A color sensor conforming to the I²C (Inter-Integrated Circuit) interface can be used as the sensor element 2a.

The first cover 2d is attached to the mounting substrate 1b. The first cover 2d is configured to hold the light guide member 2c. The first cover 2d is arranged in the vicinity of the light sources and the sensor element 2a. The first cover 2d is made of a resin material such as an epoxy resin. The first cover 2d is preferably made of a black resin. In the case where the first cover 2d is made of the black resin, influence of external light, light reflected by the mounting substrate 1b, or the like on the light from the light sources guided in the light guide member 2c can be suppressed.

The light guide member 2c is configured to be housed in a recess of the first cover 2d. The light guide member 2c is configured to guide light from each of the light sources having different emission colors that are mounted in the mounting substrate 1b to the sensor element 2a.

The light guide member 2c includes a first light receiving portion 2c1, a second light receiving portion 2c2, a third light receiving portion 2c3, and a fourth light receiving portion 2c4, as shown in FIG. 5. The first light receiving portion 2c1 is provided so as to oppose the red LED 1a1. The second light receiving portion 2c2 is provided so as to oppose the green LED 1a2. The third light receiving portion 2c3 is provided so as to oppose the blue LED 1a3. The fourth light receiving portion 2c4 is provided so as to oppose the white LED 1a4. The light guide member 2c is configured to cause red light that enters the first light receiving portion 2c1 to be incident on a light receiving surface of the sensor element 2a. The light guide member 2c is configured to cause green light that enters the second light receiving portion 2c2 to be incident on a light receiving surface of the sensor element 2a. The light guide member 2c is configured to cause blue light that enters the third light receiving portion 2c3 to be incident on a light receiving surface of the sensor element 2a. The light guide member 2c is configured to cause white light that enters the fourth light receiving portion 2c4 to be incident on a light receiving surface of the sensor element 2a. The light guide member 2c is made of an acrylic resin. The light guide member 2c is not limited to the configuration of being made of an acrylic resin. The light guide member 2c may be formed with a light transmitting resin such as a polycarbonate resin. The material of the light guide member 2c is not limited to the light transmitting resin, and the light guide member 2c may be made of glass. The light guide member 2c is formed in an appropriate shape. The second cover 2b is provided so as to cover the light guide member 2c. The second cover 2b can be made of a constituent material such as an epoxy resin. The second cover 2b is preferably made of a black resin. In the case where the second cover 2b is made of a black resin, the influence of external light on light from the light sources that is guided in the light guide member 2c can be suppressed.

The controller 3 includes a drive controller 3a, a lighting circuit 3b, a communicator 3c, and a drive power supply 3d, as shown in FIG. 1. The drive controller 3a is configured to output a control signal for controlling the lighting circuit 3b. The control signal may be a PWM (Pulse Width Modulation) signal generated so as to correspond to a duty ratio. The drive controller 3a can cause predetermined currents to flow in respective light sources by controlling on and off of respective switching elements that constitute the lighting circuit 3b, with the PWM signals. The drive controller 3a is configured to separately control outputs of the two or more types of light sources having different emission colors. In other words, the drive controller 3a is configured to separately perform light modulation control on the red LED 1a1, the green LED 1a2, the blue LED 1a3, and the white LED 1a4. The drive controller 3a can separately acquire a light amount of red light, a light amount of green light, and a light amount of blue light based on the detection values outputted from the sensor 2.

The drive controller 3a is constituted by a microcomputer including a CPU (Central Processing Unit), for example. The microcomputer can perform a predetermined control operation by executing an appropriate program stored in a built-in storage 3a1. The storage 3a1 is constituted by an electrically rewritable nonvolatile semiconductor memory. The semiconductor nonvolatile memory is a flash memory, an EEPROM (Electrically Erasable and Programmable Read Only Memory), or the like, for example. A correction coefficient for correcting light outputs of the light sources may be stored in the storage 3a1. The correction coefficient is a correction value for modulating the pulse width of the PWM signal such that the light amount of a light source detected by the sensor 2 is a predetermined light amount, for example.

The lighting circuit 3b is configured to adjust the light output of the light source portion 1a. The lighting circuit 3b includes a first lighting circuit 3b1, a second lighting circuit 3b2, a third lighting circuit 3b3, and a fourth lighting circuit 3b4. The first lighting circuit 3b1 is configured to control lighting of the red LED 1a1. The second lighting circuit 3b2 is configured to control lighting of the green LED 1a2. The third lighting circuit 3b3 is configured to control lighting of the blue LED 1a3. The fourth lighting circuit 3b4 is configured to control lighting of the white LED 1a4. The first lighting circuit 3b1, the second lighting circuit 3b2, the third lighting circuit 3b3, and the fourth lighting circuit 3b4 essentially have the same configuration. The illumination device 10 is configured to emit mixed light having an arbitrary light color by separately supplying power from the lighting circuit 3b to the red LED 1a1, the green LED 1a2, the blue LED 1a3, and the white LED 1a4. The illumination device 10, for example, emits white light by adjusting the ratio of the light outputs of the red LED 1a1, the green LED 1a2, and the blue LED 1a3. Hereinafter, the configuration of the first lighting circuit 3b1 will be mainly described.

The first lighting circuit 3b1 includes a step-down chopper circuit and a drive circuit. The step-down chopper circuit includes a switching element. The drive circuit controls on and off of the switching element. In the first lighting circuit 3b1, a switching power supply circuit is configured by the step-down chopper circuit and the drive circuit. The first lighting circuit 3b1 steps down a DC voltage from the external power supply 22 to a driving voltage appropriate for a series circuit of the plurality of red LEDs 1a1 that constitute the light source portion 1a. The first lighting circuit 3b1 can increase and decrease the light output of the red LED 1a1 according to the duty ratio of the switching element. The first lighting circuit 3b1 can control the plurality of red LEDs 1a1 that are connected in series as a whole.

The communicator 3c is configured to mutually communicate with the control device 21 that is provided outside the illumination device 10. The communicator 3c is configured to transmit correction coefficient information for reducing variation in light color of light emitted from the illumination device 10, and variation in color between a plurality of illumination devices 10, to the controller 3. The communicator 3c is constituted by an RS-485 transceiver, for example. The RS-485 transceiver can transmit and receive RS-485 signals conforming to the communication standard of the Electronic Industries Alliance.

The drive power supply 3d is configured to supply electric power for driving to the drive controller 3a, the lighting circuit 3b, and the communicator 3c. The drive power supply 3d is configured to divide the voltage of the electric power from the external power supply 22 with a series circuit of two resistors, and supply predetermined electric power for driving, for example.

The casing 4 includes a body 4a, a pair of end surface plates 4b, and a plurality of fixing screws 4c, as shown in FIGS. 5 to 7. The casing 4 has an elongated external shape. The casing 4 is configured to hold the light source unit 10a and the optical member 5.

The body 4a includes a bottom plate 4a1 and a pair of side plates 4a2. The bottom plate 4a1 has a rectangular external shape in plan view. The bottom plate 4a1 includes a pair of cutout portions 4k. The bottom plate 4a1 is configured such that two ends of the bottom plate 4a1 in a longitudinal direction are cut out to form the cutout portions 4k. The side plates 4a2 are provided along the longitudinal direction of the bottom plate 4a1 so as to respectively protrude in a thickness direction of the bottom plate 4a1 from two end portions of the bottom plate 4a1 in a short direction. The side plates 4a2, which form a pair, are arranged so as to oppose each other. Each side plate 4a2 is provided with a pair of ribs 4d in a leading end portion opposite to the bottom plate 4a1. Each rib 4d is provided so as to extend inward of the casing 4 from the leading end portion of the side plate 4a2 along a thickness direction of the side plate 4a2. Each rib 4d is provided along the longitudinal direction of the casing 4. Flange portions 5b of the optical member 5 are respectively inserted into groove portions 4da respectively formed by the pairs of ribs 4d so as to hold the optical member 5. A cross section of the body 4a along a direction orthogonal to the longitudinal direction has a C-like external shape with the bottom plate 4a1 and the pair of side plates 4a2, as shown in FIGS. 5 and 7. Two end portions of the body 4a in the longitudinal direction open, and a pair of plate-like end surface plates 4b is provided so as to close the opening.

The casing 4 includes an opening 4aa. The opening 4aa is provided so as to be surrounded by the bottom plate 4a1, the pair of side plates 4a2, and the pair of end surface plates 4b. The casing 4 is configured such that the opening 4aa is closed by the optical member 5. The casing 4 is formed so as to house the light source unit 10a. The casing 4 is configured such that the light source unit 10a is fixed to the bottom plate 4a1 by screws, for example.

The body 4a includes a plurality of screw holding portions 4e, as shown in FIG. 7. A cross section of each of the screw holding portions 4e has a C-like external shape. The screw holding portions 4e are provided in two end portions on a rear surface side of the bottom plate 4a1 opposite to a surface side on which the side plates 4a2 protrude. The screw holding portions 4e are each configured such that a fixing screw 4c that passes through the end surface plate 4b is screwed thereto. The body 4a includes a pair of leg portions 4f. The leg portions 4f are each provided along the longitudinal direction of the body 4a. A cross section of each of the leg portion 4f along a direction orthogonal to the longitudinal direction has an L-like external shape. The leg portions 4f protrude in a direction separating from the bottom plate 4a1 along a thickness direction of the bottom plate 4a1 of the body 4a. The leg portions 4f, which form a pair, are configured such that leading ends thereof separate from each other. A plurality of through holes may be formed in the leg portions 4f such that the illumination device 10 is held to a held body by screws.

The optical member 5 is configured such that light from the light source portion 1a can pass through. The optical member 5 is made of a light transmitting material. The light transmitting material is an acrylic resin, an epoxy resin, glass, or the like, for example. The optical member 5 includes a lens 5a shown in FIG. 7 on a surface that opposes the light source portion 1a shown in FIG. 5. The lens 5a is configured to cause light from the light source portion 1a to exit outside the casing 4 having a predetermined light distribution characteristic. The lens 5a can be constituted by a Fresnel lens, for example. The optical member 5 is formed in an elongated flat plate external shape. The optical member 5 includes flange portions 5b, which form a pair, in two ends thereof in a short direction along a longitudinal direction. The flange portions 5b, which form a pair, are formed so as to extend outward respectively from the two ends of the optical member 5 in the short direction. The optical member 5 is configured such that the flange portions 5b are slidably inserted into the respective groove portions 4da each constituted by the pair of ribs 4d provided along the longitudinal direction of the body 4a. The optical member 5 is configured to be attached to or removed from the body 4a.

When the illumination device 10 is assembled, the light source unit 10a and the optical member 5 are inserted inside the body 4a from an end portion of the body 4a that is open.

The opening of the illumination device 10 is closed by the end surface plate 4b after the light source unit 10a and the optical member 5 have been housed inside the body 4a. Each end surface plate 4b is fixed to the body 4a by the fixing screws 4c being screwed into the screw holding portions 4e.

Hereinafter, an airplane 30a shown in FIG. 8 will be described as the mobile body 30 including the illumination device 10 of the present embodiment. In the airplane 30a, a plurality of illumination devices 10 are provided in a passenger cabin 30aa. In the airplane 30a, the control device 21 shown in FIG. 1 is provided in a cockpit, for example. The control device 21 is configured to control the illumination devices 10 provided in the passenger cabin 30aa. The airplane 30a includes the plurality of illumination devices 10. The plurality of illumination devices 10 are linearly arranged in a longitudinal direction along a front-rear direction in the airplane 30a. A frame of the airplane 30a constitutes a body in which the illumination system 20 shown in FIG. 1 is mounted. That is, the mobile body 30 according to the present embodiment preferably includes the illumination system 20 and the body to which the illumination system 20 is to be mounted. The mobile body 30 is not limited to the airplane 30a, and may be a vehicle driven by a linear motor, or the like.

Figure 8:
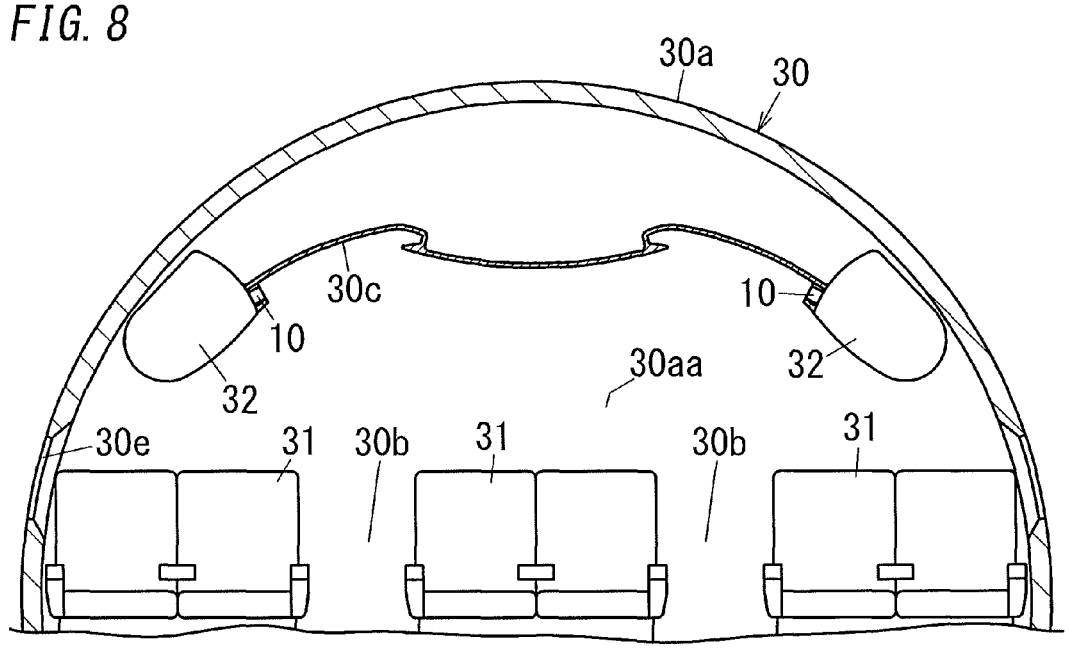
FIG. 8 is a cross-sectional view illustrating a mobile body according to Embodiment 1 with a partial cutaway thereof.

In the mobile body 30 according to the present embodiment, the illumination devices 10 are provided in an upper portion in the passenger cabin 30aa in the airplane 30a in which two aisles 30b are provided, for example, as shown in FIG. 8. In the airplane 30a, seats 31 on window 30e sides are provided between an aisle 30b and the corresponding window 30e, and seats 31 on an aisle 30b side are provided between the two aisles 30b.

Three sets of seats 31 are provided, two lines of seats 31 being arranged in each set along the left-right direction in the airplane 30a. In the airplane 30a, overhead compartments 32 are provided in an upper side in a vertical direction corresponding to the seats 31 on the window sides. The overhead compartments 32 each constitute an elongated storage rack provided along the front-rear direction of the airplane 30a. The overhead compartments 32 are arranged so as to be in contact with a ceiling material 30c above the seats 31.

The illumination devices 10 are arranged along the aisles 30b extending along the front-rear direction of the airplane 30a so as to illuminate the ceiling material 30c in the passenger cabin 30aa. The illumination devices 10 are attached to the ceiling material 30c of the airplane 30a serving as the held body, with the leg portions 4f being fixed with screws or the like. The illumination devices 10 are arranged so as not be seen by passengers seated in the seats 31.

Next, operations of the illumination device 10 of the present embodiment will be described in more detail.

In recent years, reduction in size and weight of illumination devices can be easily realized by using light sources constituted by a solid-state light emitting device such as an LED or an organic EL element. The illumination devices using the light sources constituted by solid-state light emitting devices are also used in a mobile body such as an airplane as a result of reduction in size and weight. The airplane includes a plurality of illumination devices. In the case of using a plurality of LEDs in an illumination device, variation in light outputs may occur in a plurality of illumination devices caused by individual differences of LEDs and differences in aging degradation of LEDs, and in temperature characteristics of different types of LEDs. In the illumination device, variation in color may occur due to variation in light outputs of light sources. The variation in color in a plurality of illumination devices can be reduced by detecting a light amount of a light source with a sensor and performing feedback control such that the light amount of the light source is maintained in a target range, in each of the illumination devices.

However, in the case where each of the light sources having different emission colors is lit so as to detect the light amount thereof with a sensor in order to reduce variation in color in the illumination device, passengers in an airplane may have an odd feeling every time correction for reducing the variation in color is performed.

Also, even if light sources have been controlled once, in each of the illumination devices, such that the light sources are lit so as to reduce variation in color in a plurality of illumination devices, correction for reducing variation in color due to a change in ambient temperature and temperature increase due to lighting of the light sources, may need to be performed again. In an illumination device, specifically in the case where the light sources are LEDs, the green LED, the blue LED, or the white LED can be caused to emit light having high luminance with a structure in which a semiconductor material such as InGaN is used as a light emitting layer. The red LED can be caused to emit light having high luminance with a structure in which a semiconductor material such as AlInGaP or GaP is used as a light emitting layer. In the illumination device, the light output characteristic, with respect to a temperature change, of the red LED having a different semiconductor material tends to be substantially different from those of the green LED, the blue LED, and the white LED.

Furthermore, in the illumination device, the detection time for detecting the light amount of each of the light sources with the sensor decreases as the number of the light sources with different emission colors increases, and accurate detection of the light amount of each of the light sources becomes difficult.

The illumination device 10 of the present embodiment is configured such that the control signal for controlling the lighting circuit 3b with the drive controller 3a can be corrected in advance, when the illumination device 10 is shipped from a factory, for example, so as not to cause variation in color in a plurality of illumination devices 10. The illumination device 10 can be corrected so as to make variation in color in a plurality of illumination devices 10 smaller using a spectroscope that measures emitted light. The correction is performed by comparing the chromaticity of the illumination device 10 based on the light amounts of the light source portion 1a detected by the sensor 2 and the chromaticity measured by the spectroscope, for example. A correction coefficient with which the chromaticity based on the light amounts detected by the sensor 2 matches the chromaticity measured by the spectroscope is stored in the storage 3a1 of the drive controller 3a in the illumination device 10. The correction coefficient can be computed by a computer connected to the spectroscope and the sensor 2 of the illumination device 10, for example. The computer computes a correction coefficient with which the light amount detected by the sensor 2 becomes a predetermined value.

In the illumination device 10, the controller 3 controls lighting of each of two or more light sources having different emission colors with PWM signals corrected with the correction coefficient so as to emit light of the light color that is based on a light modulation signal from the control device 21. As a result of the correction using the spectroscope of each illumination device 10 of the present embodiment, initial variation in color in the plurality of illumination devices 10 is made smaller in advance.

The illumination device 10 corrects a light modulation signal using the correction coefficient, and controls lighting of the light source portion 1a by causing a current of a predetermined duty ratio to flow through each of the light sources having different emission colors so as to emit light having a light color corresponding to the light modulation signal from the control device 21.

Next, in the illumination device 10 of the present embodiment, control for further reducing variation in color will be described. The illumination device 10 is configured to correct variation in color that occurs in a plurality of illumination devices 10 at predetermined intervals so as to reduce the occurrence of variation in color in the plurality of illumination devices 10. The illumination device 10 can make variation in light output of emitted light after being attached to the mobile body 30 smaller, for example, by correcting the light amount of the light source portion 1a at constant intervals.

In the illumination device 10, for each of two or more light sources having different emission colors, the sensor 2 detects a light amount of the light source and outputs the detection value to the drive controller 3a. In the illumination device 10 of the present embodiment, for example, a period that is 13.7% of one operation cycle of the PWM signal is the single color period, and the remaining period that is 86.3% of the one operation cycle is the mixed color period.

In the illumination device 10, a duty ratio set value corresponding to the light modulation signal from the control device 21 is caused to be stored in a register of a microcomputer that constitutes the drive controller 3a as is, in order to turn on the light source having the detection target emission color to be detected by the sensor 2. In the illumination device 10, in the case where the duty ratio set value is 13.7% or less of one operation cycle of the PWM signal, the sensor 2 does not detect the light amount of the detection target light source.

In other words, in the illumination device 10 of the present embodiment, the sensor 2 preferably does not detect the light amount of the detection target light source in the case where the lighting period of the detection target light source in the first period is shorter than a preset detection time for detecting the detection value.

In the illumination device 10, the detection sensitivity can be easily further improved, as a result of the sensor 2 not detecting the light amount of the detection target light source, whose light amount is to be detected, in the case where the lighting period of the detection target light source in the first period is shorter than the preset detection time for detecting the detection value.

In the illumination device 10, the duty ratio set value corresponding to the light modulation signal from the control device 21 is modified in order to turn on light sources having emission colors that are not the detection target to be detected by the sensor 2. In the illumination device 10, the modified duty ratio set value is stored in the register of the microcomputer that constitutes the drive controller 3a. In the illumination device 10, lighting of the light sources is controlled by setting a value that results from adding a time corresponding to 13.7% of one operation cycle as the detection time during which the sensor 2 performs detection to the duty ratio set value corresponding to the light modulation signal to the register.

Figure 4:
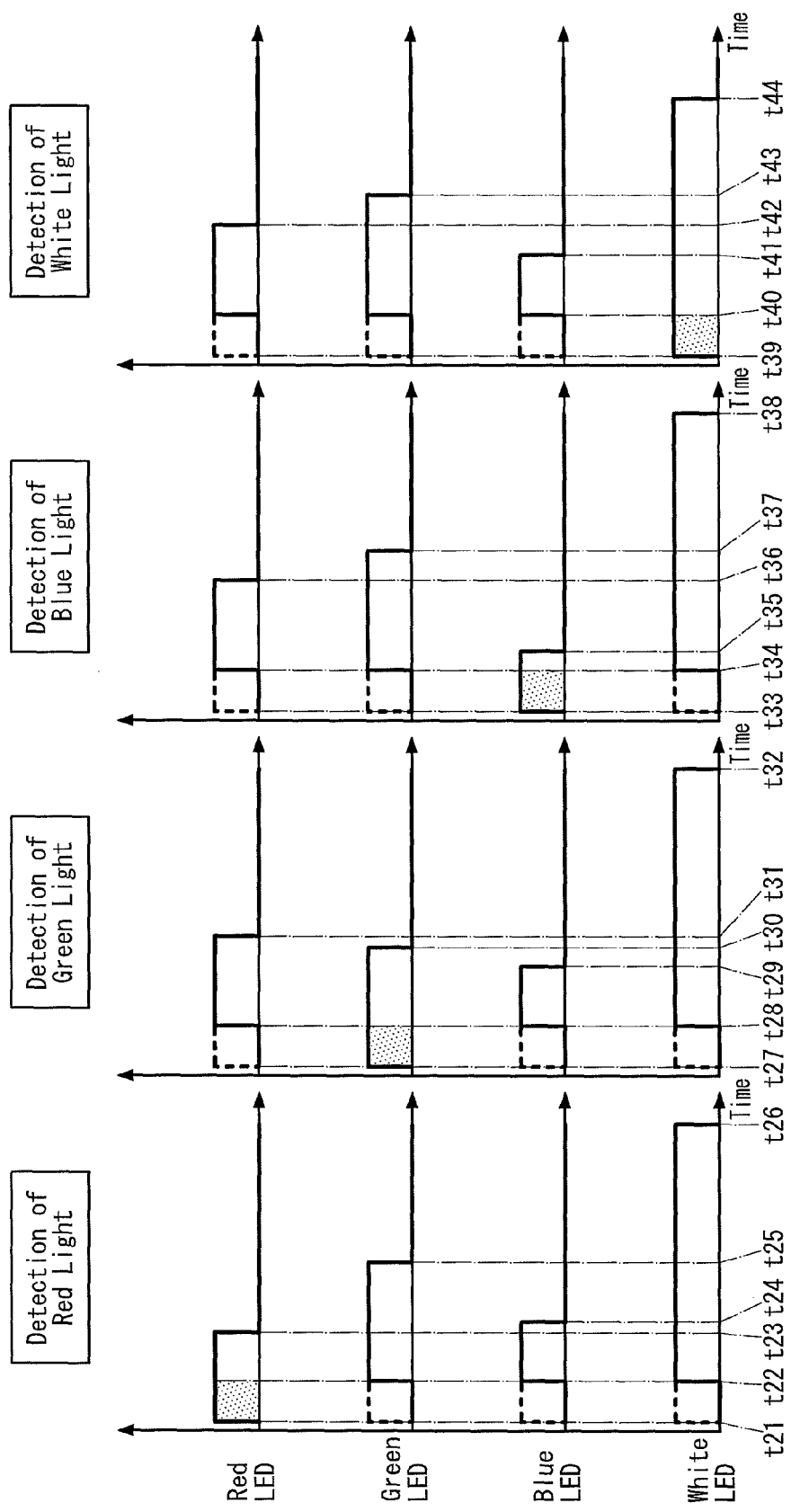
FIG. 4 is a graph for describing another first period and second period in Embodiment 1.

In the illumination device 10, the controller 3 preferably performs phase difference (a volume of the phase shift) control in which a timing at which only the detection target light source on which the sensor 2 performs light amount detection is caused to start light emission and a timing at which the remaining light sources are caused to start light emission are shifted in the one operation cycle, as shown in FIG. 4.

The illumination device 10 of the present embodiment can maintain the total light amount in one operation cycle with a relatively simple configuration in which phase difference control is performed.

The controller 3 shifts the timing at which lighting of the light sources other than the detection target among the plurality of light sources having different emission colors to a point in time after the single color period during which detection of the light amount of the detection target light source has been completed. In the illumination device 10, the duty ratios, in one operation cycle, of the detection target light source and the light sources other than the detection target are not changed. The sensor 2 detects a light amount of only one type of light source in a single color period.

In the illumination device 10 of the present embodiment, in the case where a light amount of a given light source is detected, even in a case where all the light sources having different emission colors are to be lit, the timing at which the detection target light source is lit and the timing at which the light sources other than the detection target are lit are different.

In the illumination device 10, after only the detection target light source is lit first, the light amount is detected, and the detection by the sensor 2 is complete, lighting of the detection target light source is maintained, and lighting of the light sources other than the detection target is started. In the illumination device 10, if the lighting time of the detection target light source and the lighting time of the light sources other than the detection target are the same, because the detection target light source is lit earlier, the detection target light source is turned off earlier than the light sources other than the detection target.

In the illumination device 10, duty ratios of all the LEDs are controlled so as not to change before and after correction in the period consisting of the single color period in which a light amount of a light source is detected and in the mixed color period. The illumination device 10 can make a person upon viewing light from the illumination device 10 not recognize that only a light source having a different emission color is lit. In the illumination device 10, even when a person recognizes emitted light, occurrence of the light color of emitted light being seen as changing can be suppressed. Although detection of a light amount of one light source among the plurality of light sources in the illumination device 10 has been described, light amounts of the other light sources are separately detected in a similar procedure.

In the illumination device 10, in the case where the light amounts of light sources are detected by the sensor 2, even if the single color period is provided, if the ratio of duty ratios of the light sources is kept constant, the light color of mixed light of light of two or more types of light sources having different emission colors does not change from that in a case of control in which the single color period is not provided.

In the illumination device 10 of the present embodiment, the integrated value of the detection values detected a predetermined number of times in one operation cycle is the detection result, as shown in FIG. 3. In FIG. 3, integration of detection values detected by the sensor 2 is performed ten times as the predetermined number of times. The predetermined number of times can be set appropriately according to the light detection accuracy of the sensor 2, computing power for integration of detection data, and a degree for suppressing variation in light output. The illumination device 10 is configured to detect red light from the red LED 1a1 ten times with the sensor 2 in the first single color period T1 in which the light amount of the red LED 1a1 is detected, and control lighting of the red LED 1a1 using an addition value in which ten detection values are added together as the detection result. The illumination device 10 is configured to detect green light from the green LED 1a2 ten times by the sensor 2 in the second single color period T2 in which the light amount of the green LED 1a2 is detected, and control lighting of the green LED 1a2 using an addition value in which ten detection values are added together as the detection result. The illumination device 10 is configured to detect blue light from the blue LED 1a3 ten times by the sensor 2 in the third single color period T3 in which the light amount of the blue LED 1a3 is detected, and control lighting of the blue LED 1a3 using an addition value in which ten detection values are added together as the detection result. The illumination device 10 is configured to detect white light from the white LED 1a4 ten times by the sensor 2 in the fourth single color period T4 in which the light amount of the white LED 1a4 is detected, and control lighting of the white LED 1a4 using an addition value in which ten detection values are added together as the detection result.

The illumination device 10 of the present embodiment transmits the detection values detected a predetermined number of times by the sensor 2 to the control device 21 via the communicator 3c. In the control device 21, an integrated value of the detection values detected a predetermined number of times is computed as the correction coefficient. The control device 21 transmits the detection result using the computed correction coefficient to the illumination device 10. The illumination device 10 controls lighting of the light source portion 1a based on the detection result. The illumination system 20 is not limited to the configuration in which the control device 21 computes the correction coefficient, and the correction coefficient may be computed by the drive controller 3a in the illumination device 10. In the illumination device 10, the corrected duty ratio is computed by multiplying the value of the light modulation signal by the correction coefficient, and correction is performed using the corrected duty ratio. In the illumination device 10, the detected value of the detection values detected a predetermined number of times is not limited to a value resulting from integrating the detection values detected a predetermined number of times, and may be an average value of the detection values detected a predetermined number of times or a maximum value of the detection values detected a predetermined number of times.

The controller 3 preferably controls current to the light sources in the case where light amounts of the light sources are detected. In the illumination device 10, when the maximum duty ratio of the light sources is 86.3%, for example, if the maximum duty ratio when lit is 100%, the brightness of the mixed light emitted from the light source portion 1a when the light amount is detected decreases by 14% approximately. In the illumination device 10, the controller 3 performs control so as to increase current flowing through the light sources when the light amount is detected compared with the current flowing though the light sources when detection by the sensor 2 is not performed, for example. The illumination device 10 can maintain the brightness of the mixed light emitted from the light source portion 1a to be constant before and after the detection of the light amount by increasing the current flowing through the light sources.

Embodiment 2

Figure 9:
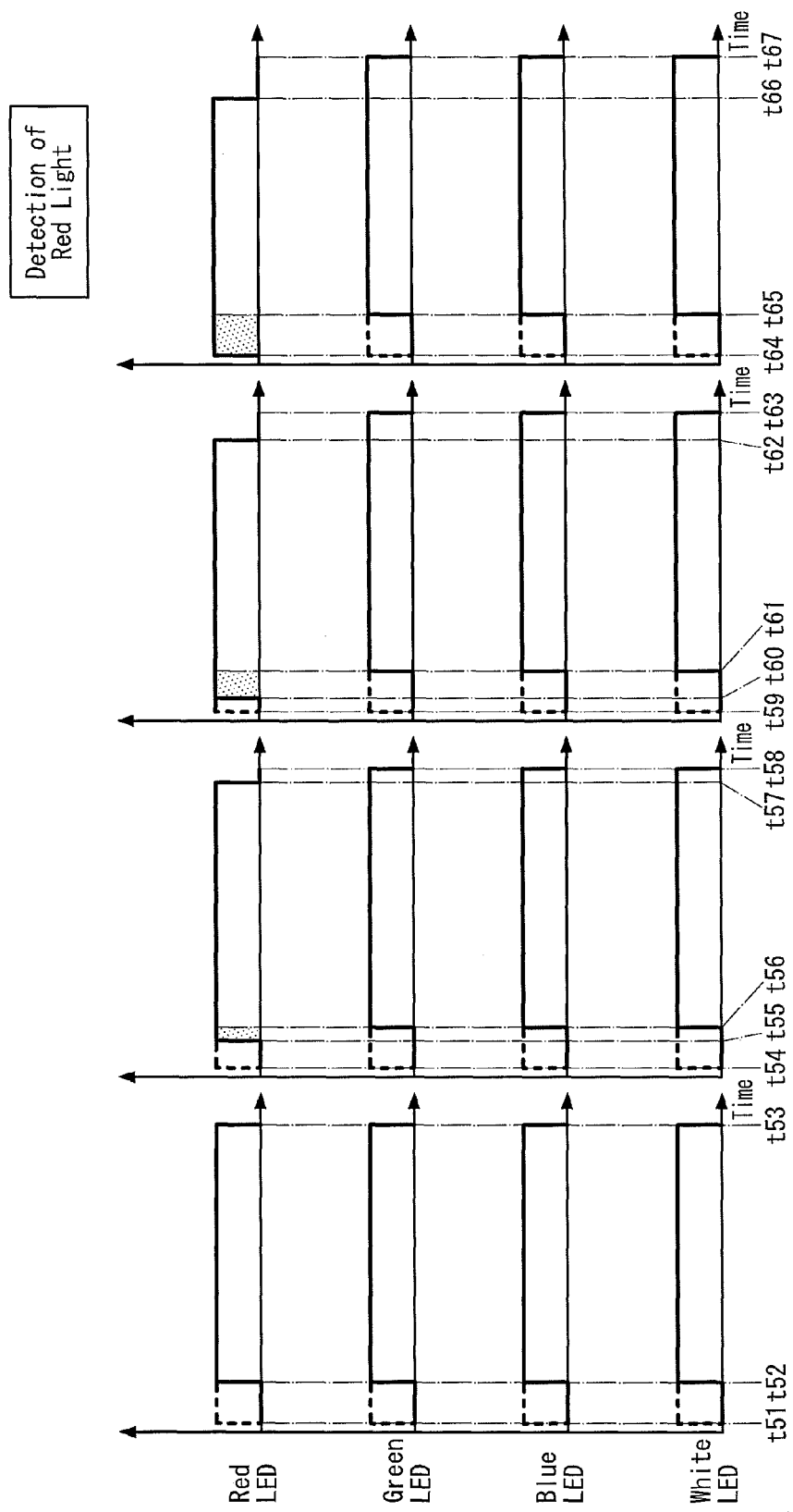
FIG. 9 is a graph for describing a first period and a second period in Embodiment 2.

An illumination device 10 of the present embodiment mainly differs from the illumination device 10 of Embodiment 1 in that the control in Embodiment 1 shown in FIG. 2 or 4 is changed to control shown in FIG. 9. In the illumination device 10, control of lighting of a light source portion 1a and control of light amount detection with a sensor 2 can be changed appropriately by changing the program stored in a storage 3a1 of a drive controller 3a appropriately. An illumination system 20 according to the present embodiment can be configured by changing the program in the configuration of the illumination system 20 shown in FIG. 1. Constituent elements similar to those in Embodiment 1 are provided with the same reference sign and description thereof will be omitted as appropriate.

In the illumination device 10 of the present embodiment, the controller 3 performs phase difference control in which a timing, in one operation cycle, at which only a detection target light source on which the sensor 2 performs light amount detection is caused to start light emission and a timing at which remaining light sources are caused to start light emission are shifted. In the illumination device 10, the controller 3 preferably gradually increases the phase difference over two or more operation cycles in a plurality of operation cycles.

In the illumination device 10 of the present embodiment, flickering of light emitted from the illumination device 10 can be suppressed compared with the configuration in which control is performed such that the phase difference is the same, as a result of the controller 3 gradually increasing the phase difference.

Hereinafter, control of the illumination device 10 of the present embodiment will be described in more detail.

In the illumination device 10, the controller 3 separately controls lighting of two or more types of light sources having different emission colors, based on the duty ratio of a PWM signal. The controller 3 causes only one type of light source to emit light in a single color period while maintaining a given duty ratio in one operation cycle of the PWM signal. The controller 3 performs control such that the timing at which remaining types of light sources different from the one type of light source is caused to start emission while maintaining the duty ratio in one operation cycle of the PWM signal is shifted from the timing at which the one type of the light source is caused to start emission. An example in which the phase difference gradually increases over a plurality of operation cycles is shown in FIG. 9. In FIG. 9, a period from time t51 to time t53, a period from time t54 to time t58, a period from time t59 to time t63, and a period from time t64 to time t67 are each one operation cycle. In FIG. 9, a period from time t51 to time t52, a period from time t54 to time t56, a period from time t59 to time t61, and a period from time t64 to time t65 are each a single color period.

In the illumination device 10, as shown in FIG. 9, in the period from time t51 to time t53, the timings at which the red LED 1a1, the green LED 1a2, the blue LED 1a3, and the white LED 1a4 respectively start light emission is the same, and phase shift control is not performed. The illumination device 10, in the period from time t54 to time t58 that is one operation cycle next to the one operation cycle from time t51 to time t53, causes the red LED 1a1 to start light emission at time t55, and causes the green LED 1a2, the blue LED 1a3, and the white LED 1a4 to start light emission at time t56. The illumination device 10 performs phase difference control in which the timing at which the red LED 1a1 is caused to start light emission is advanced relative to the timing at which the green LED 1a2, the blue LED 1a3, and the white LED 1a4 are caused to start light emission. The illumination device 10, in the period from time t59 to time t63 that is one operation cycle next to the one operation cycle from time t54 to time t58, causes the red LED 1a1 to start light emission at time t60, and causes the green LED 1a2, the blue LED 1a3, and the white LED 1a4 to start light emission at time t61. In the illumination device 10, the timing at which the red LED 1a1 is caused to start light emission is further advanced relative to the timing at which the green LED 1a2, the blue LED 1a3, and the white LED 1a4 are caused to start light emission, and the phase difference is further increased. The illumination device 10, in the period from time t64 to time t67 that is one operation cycle next to the one operation cycle from time t59 to time t63, causes the red LED 1a1 to start light emission at time t64, and causes the green LED 1a2, the blue LED 1a3, and the white LED 1a4 to start light emission at time t65. In the illumination device 10, the timing at which the red LED 1a1 is caused to start light emission is advanced relative to the timing at which the green LED 1a2, the blue LED 1a3, and the white LED 1a4 are caused to start light emission such that the phase difference is at its largest.

In the illumination device 10 of the present embodiment, the sensor 2 preferably detects the light amount of the detection target light source in a first period in the one operation cycle in which the phase difference is the largest among two or more operation cycles.

In the illumination device 10, the detection sensitivity can be easily increased as a result of the sensor 2 detecting the light amount of the light source in a first period in the one operation cycle in which the phase difference is the largest.

In the illumination device 10 of the present embodiment, the sensor 2 preferably does not detect the light amount of the detection target light source in the case where the lighting period of the detection target light source in the first period is shorter than a preset detection time for detecting the detection value.

In the illumination device 10, the detection sensitivity can be easily further improved, as a result of the sensor 2 not detecting the light amount of the detection target light source, on which the light amount is detected, in the case where the lighting period of the detection target light source in the first period is shorter than the preset detection time for detecting the detection value.

In the illumination device 10, in the case where the lighting period of the light source in the first period is shorter than a predetermined detection time, even if the light source is not controlled with the detection value detected by the sensor 2, variation in light output is small and computation processing for integrating detection values can be simplified.

Figure 10:
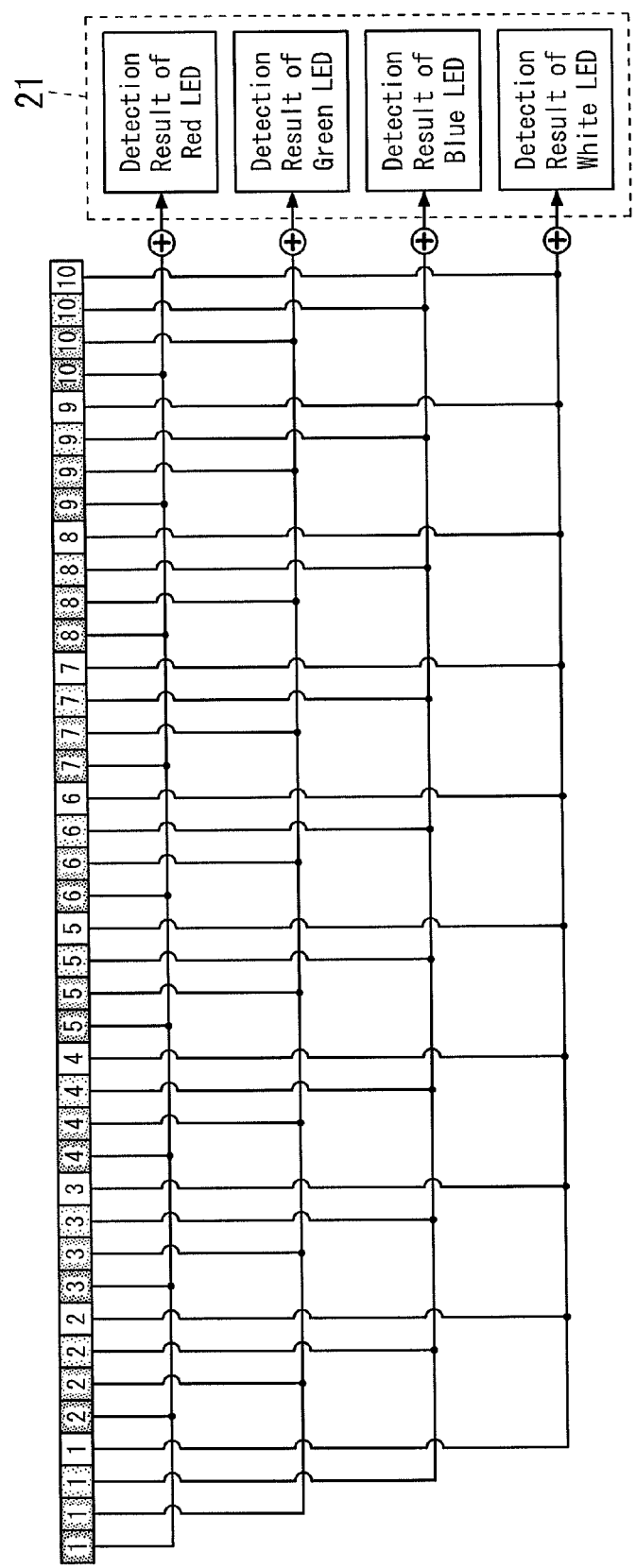
FIG. 10 is a diagram for describing a detection result in Embodiment 2.

In the illumination device 10 of the present embodiment, different from Embodiment 1 shown in FIG. 3, a value of detection values, each detected in one operation cycle, that are integrated a predetermined number of times, is the detection result, as shown in FIG. 10. In other words, the detection result is an integrated value of the detection values in a predetermined number of operation cycles. Ten times is illustrated as the predetermined number of times in FIG. 10.

The illumination device 10 is configured to detect the light amount of the red LED 1a1 one time in a single color period in one operation cycle in which the light amount of the red LED 1a1 is to be detected, and control lighting of the light source using an integrated value in which detection values of the red light detected in single color periods in a successive plurality of operation cycles are integrated as the detection result. The illumination device 10 is configured to detect the light amount of the green LED 1a2 one time in a single color period in one operation cycle in which the light amount of the green LED 1a2 is to be detected, and control lighting of the light source using an integrated value in which detection values of the green light detected in single color periods in a successive plurality of operation cycles are integrated as the detection result. The illumination device 10 is configured to detect the light amount of the blue LED 1a3 one time in a single color period in one operation cycle in which the light amount of the blue LED 1a3 is to be detected, and control lighting of the light source using an integrated value in which detection values of the blue light detected in single color periods in a successive plurality of operation cycles are integrated as the detection result. The illumination device 10 is configured to detect the light amount of the white LED 1a4 one time in a single color period in one operation cycle in which the light amount of the white LED 1a4 is to be detected, and control lighting of the light source using an integrated value in which detection values of the white light detected in single color periods in a successive plurality of operation cycles are integrated as the detection result.

In the illumination device 10, the sensor 2 performs detection of the light amount of the light source in the order of red light, green light, blue light, and white light, integration of the detection values detected for each light color is repeated a predetermined number of times, and as a result, a configuration can be obtained in which color shift is further reduced.

The illumination device 10 of the present embodiment can be configured using the configuration of the illumination device 10 of Embodiment 1 as appropriate. The illumination device 10 of the present embodiment can also be applied to the illumination system 20 and the mobile body 30 similarly to Embodiment 1.

Embodiment 3

An illumination device 10 of the present embodiment shown in FIGS. 11 to 14 differs from the illumination device 10 of Embodiment 1, shown in FIG. 1, in which the sensor 2 mainly detects the light amount of the light source portion 1a inside the illumination device 10 including the sensor 2 in that a sensor 2 also detects a light amount of another illumination device 10. Hereinafter, an illumination system 20 according to the present embodiment will be described based on FIGS. 11, 12, and 14, and a mobile body 30 will be described based on FIG. 14. Constituent elements similar to those in Embodiments 1 and 2 are provided with the same reference sign and description thereof will be omitted as appropriate.

Figure 11:
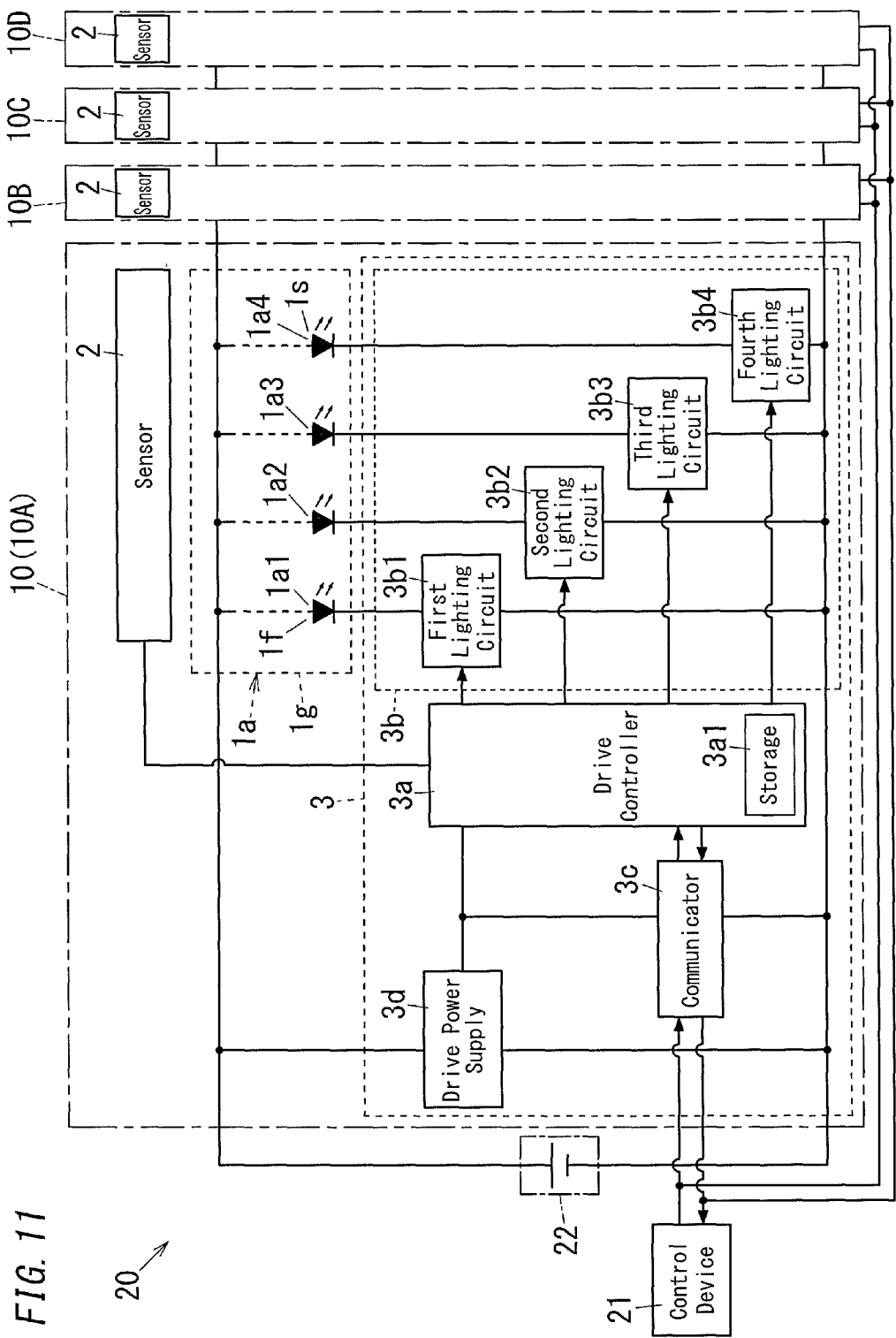
FIG. 11 is a circuit configuration diagram illustrating an illumination system including an illumination device of Embodiment 3.
Figure 12:
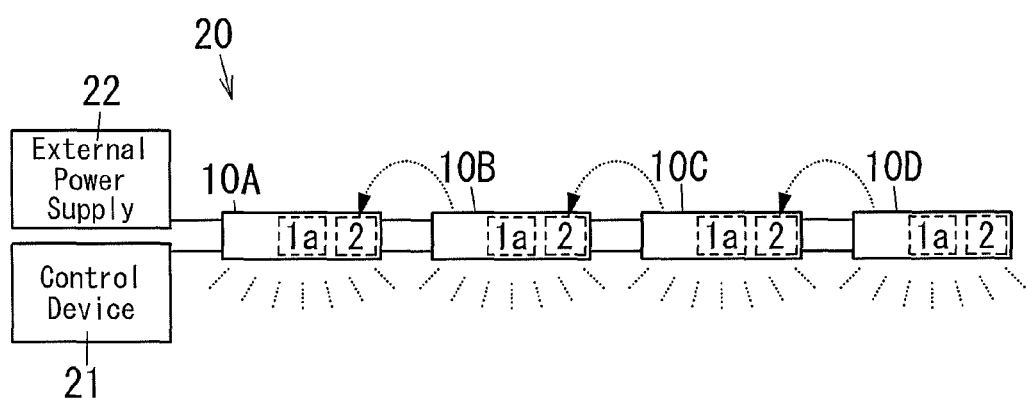
FIG. 12 is a block diagram illustrating the illumination system according to Embodiment 3.
Figure 14:
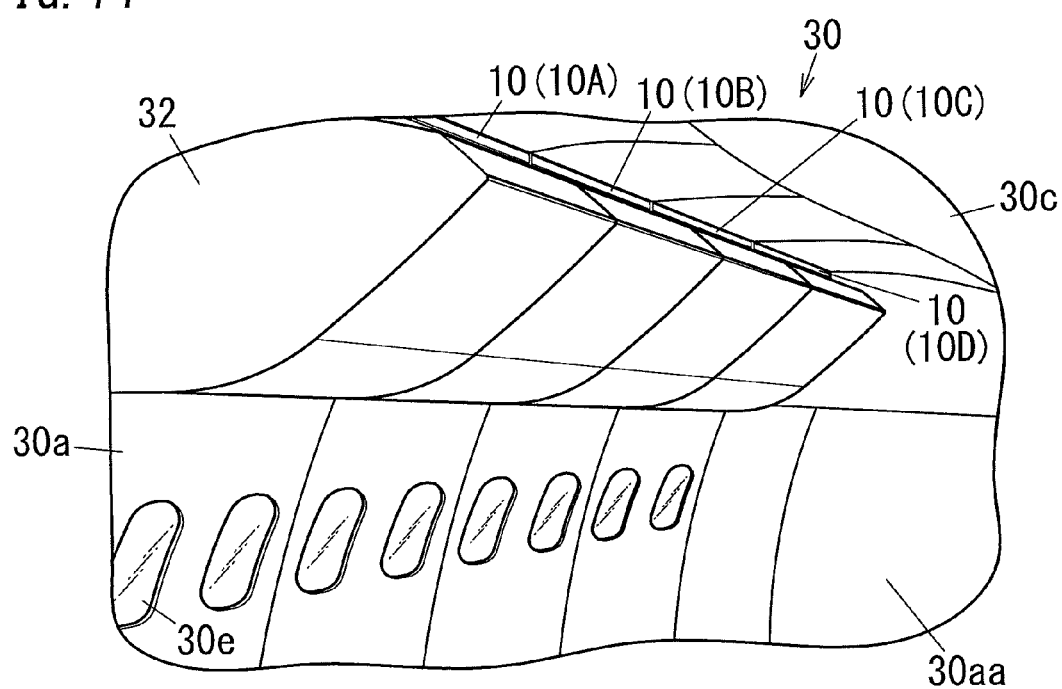
FIG. 14 is a perspective view illustrating a mobile body according to Embodiment 3 with a partial cutaway thereof.

In the illumination system 20 including the illumination device 10 of the present embodiment, a plurality of illumination devices 10 are arranged in a continuous manner. In FIGS. 11, 12, and 14, four illumination devices 10 are illustrated as the plurality of illumination devices 10. Hereinafter, the four illumination devices 10 may be referred to as a first illumination device 10A, a second illumination device 10B, a third illumination device 10C, and a fourth illumination device 10D. The first illumination device 10A is arranged so as to be adjacent to the second illumination device 10B. The second illumination device 10B is arranged so as to be adjacent to the third illumination device 10C. The second illumination device 10B is arranged between the first illumination device 10A and the third illumination device 10C. The third illumination device 10C is arranged so as to be adjacent to the fourth illumination device 10D. The third illumination device 10C is arranged between the second illumination device 10B and the fourth illumination device 10D. The first illumination device 10A, the second illumination device 10B, the third illumination device 10C, and the fourth illumination device 10D are formed with a similar structure. Hereinafter, the illumination device 10 of the present embodiment will be described taking a structure of the first illumination device 10A shown in FIG. 11 as an example.

In the illumination device 10 of the present embodiment, the sensor 2 is configured to detect a light amount of another illumination device 10. In FIGS. 11, 12, and 14, the sensor 2 of the first illumination device 10A is configured to detect the light amount of the second illumination device 10B taking the second illumination device 10B as another illumination device 10. In FIGS. 11, 12, and 14, the sensor 2 of the second illumination device 10B is configured to detect the light amount of the third illumination device 10C taking the third illumination device 10C as another illumination device 10. In FIGS. 11, 12, and 14, the sensor 2 of the second illumination device 10B is not configured to detect the light amount of the first illumination device 10A taking the first illumination device 10A as another illumination device 10. In the illumination device 10 of the present embodiment, the sensor 2 of the second illumination device 10B may be configured to detect the light amount of the first illumination device 10A taking the first illumination device 10A as another illumination device 10.

Figure 13:
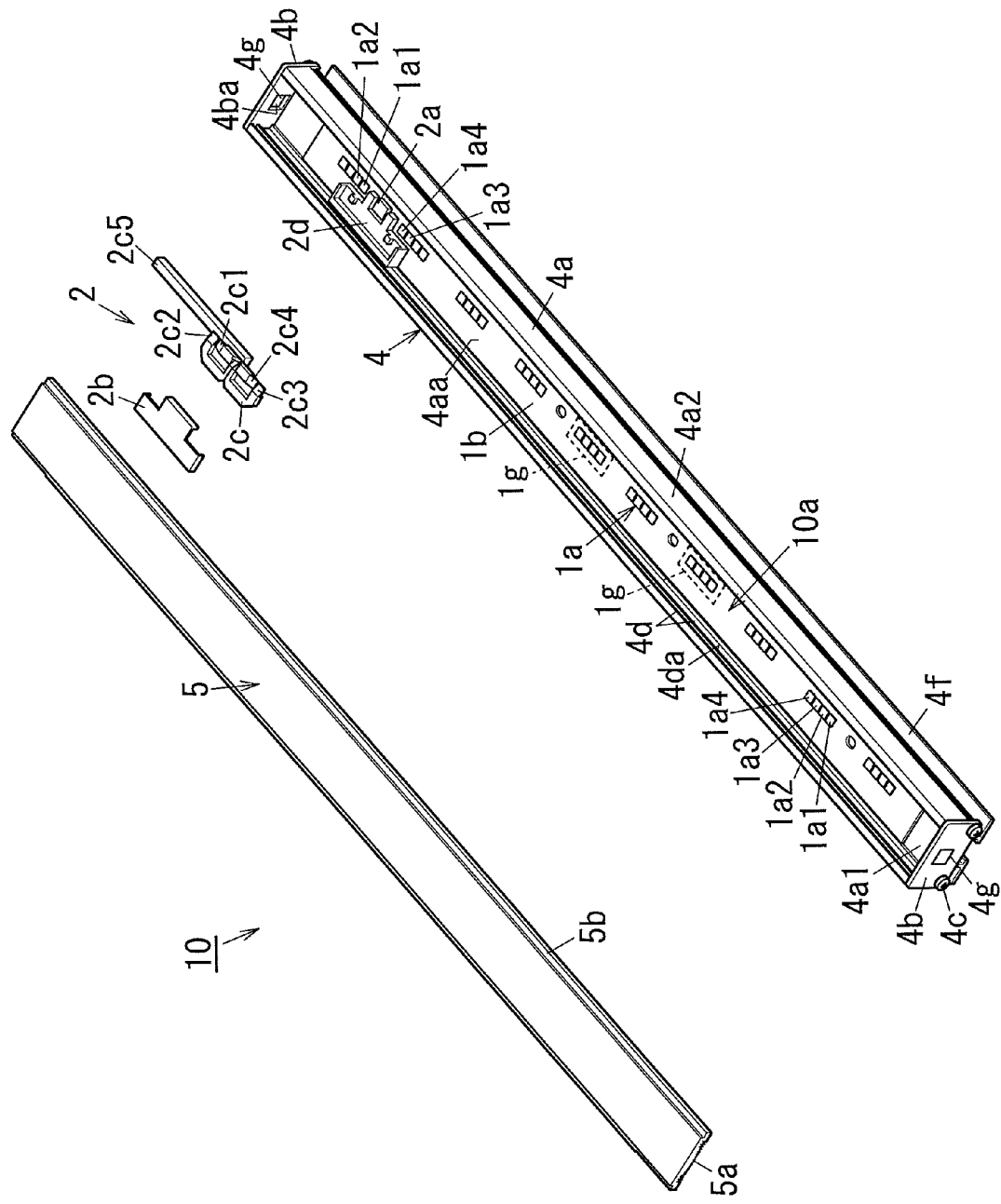
FIG. 13 is an exploded perspective view illustrating an illumination device of Embodiment 3.

In the illumination device 10 of the present embodiment shown in FIG. 13, while the sensor 2 of Embodiment 1 shown in FIG. 1 is provided in the central portion of the elongated casing 4 in the longitudinal direction, the sensor 2 is provided in one end portion of the casing 4 in the longitudinal direction. The casing 4 further includes a light receiving path 2c5. The light receiving path 2c5 is configured to guide light from adjacent another illumination device 10 to the sensor element 2a. The light receiving path 2c5 receives light from another illumination device 10 that enters via an end surface plate 4b and causes the light to be incident on a light receiving surface of the sensor element 2a.

The casing 4 includes a window hole 4ba that passes through the end surface plate 4b in the thickness direction such that light from adjacent another illumination device 10 can enter inside. In the end surface plate 4b, the window hole 4ba is sealed with a light transmitting window material 4g. The window material 4g is made of a light transmitting material. The light transmitting material of the window material 4g may be a polycarbonate resin or an acrylic resin, for example. The end surface plate 4b is not limited to the configuration in which the window material 4g is included. The end surface plate 4b may be configured such that a leading end portion of the light receiving path 2c5 is inserted into the window hole 4ba. The entirety of the end surface plate 4b may be made of a light transmitting material such that light from adjacent another illumination device 10 can enter.

In the illumination device 10, the light that the light receiving path 2c5 guides depends on light that the light source portion 1a in adjacent another illumination device 10 emits, and thus is any of red light, green light, blue light, and white light. The light receiving path 2c5 is made of an acrylic resin, for example. The light receiving path 2c5 is formed in an appropriate shape. A portion of the light receiving path 2c5 is integrally formed with the sensor 2 so as to be covered by the second cover 2b. The light source portion 1a is not limited to the configuration in which two or more types of light sources having different emission colors are included. The light source portion 1a may be configured to include a plurality of LEDs having the same emission color. The light source portion 1a may be configured such that a plurality of light sources having the same emission colors respectively form groups, and driving is performed on each of the plurality of groups.

In other words, the illumination device 10 of the present embodiment includes the elongated casing 4. The casing 4 houses the light source portion 1a, the sensor 2, and a controller 3. The casing 4 is configured such that external light from outside enters inside from an end portion in the longitudinal direction. The sensor 2 is configured to detect a light amount of the external light from outside that enters from the end portion. The controller 3 preferably controls lighting of the detection target light sources such that the light amounts of the light sources fall in respective target ranges based on the detection result corresponding to the detection values of the light amounts of the light sources detected by the sensor 2 and the detection value of the light amount of the external light detected by the sensor 2.

In the illumination device 10 of the present embodiment, variation in light amount in the illumination devices 10 can further be reduced with a relatively simple configuration in which the sensor 2 detects a light amount of the external light from outside that enters from the end portion. Specifically, in the illumination device 10 of the present embodiment, in the case where the light amount of the external light from outside that enters from the end portion corresponds to the light amount of light from another illumination device 10, the variation in light amount in the adjacent illumination devices 10 can further be reduced. That is, the controller 3 in the first illumination device 10A controls lighting of the light sources in the first illumination device 10A based on a detection result corresponding to detection values of light amounts of the light sources in the first illumination device 10A and a detection value of a light amount of the second illumination device 10B. In the illumination device 10 of the present embodiment, as a result of detecting a light amount of another illumination device 10, a light amount difference with the other illumination device 10 can be reduced.

In the illumination device 10, in the case where the external light from outside that enters from the end portion is light from a reference light source that is different from another illumination device 10, the variation in light amount in the illumination devices 10 can further be reduced.

In the illumination device 10 of the present embodiment, the casing 4 preferably includes the light receiving path 2c5 that guides the external light from the end portion to the sensor 2.

In the illumination device 10 of the present embodiment, according to the configuration in which the light receiving path 2c5 is included, the sensor 2 can accurately detect the external light from outside that enters from the end portion. In the illumination device 10, in the case where light from another illumination device 10 enters from the end portion, the light from the other illumination device 10 can be accurately detected.

Hereinafter, the configuration of the illumination system 20 of the present embodiment will be briefly described.

The illumination system 20 according to the present embodiment is included in an airplane 30a shown in FIG. 14. In the airplane 30a, a plurality of illumination devices 10

(10A, 10B, 10C, and 10D) are linearly arranged in the longitudinal direction along a front-rear direction. The plurality of illumination devices 10 are adjacently arranged to each other such that light from an adjacent illumination device 10 can enter from an end portion.

The illumination system 20 is configured such that one control device 21 controls four illumination devices 10, as shown in FIG. 11. The control device 21 is configured to separately control driving of the four illumination devices 10. The four illumination devices 10 are electrically connected to the external power supply 22. The illumination devices 10 are configured to include feed wiring. The external power supply 22 is configured to output a voltage of DC 28V, for example.

Next, operations of the illumination system 20 according to the present embodiment will be described while a comparison is made with an illumination system of a comparative example.

In the illumination system of the comparative example, a sensor provided in each of a plurality of illumination devices detects only light outputs of light sources of an illumination device that includes the sensor. In the illumination system of the comparative example, the light amounts of the light sources in each of the illumination devices are feedback-controlled based on a detection result detected by the sensor of the illumination device. In the illumination system of the comparative example, as a result of the light amount of the light sources being feedback-controlled in each of the plurality of illumination devices, variation in light output in the light sources caused due to a variation in an initial light source characteristic, time degradation of the light source, a temperature characteristic of the light source, and the like can be reduced.

Incidentally, in the illumination system of the comparative example, even if the light amounts of the light sources are feedback-controlled in each of the illumination devices, variation in light outputs in the plurality of illumination devices may occur due to variation in sensor characteristics of the sensors that detect light outputs of the light sources, time degradation of the sensors, and the like.

In contrast, in the illumination system 20 according to the present embodiment, the sensor 2 in the first illumination device 10A detects light amounts of the light sources in the first illumination device 10A, and the light amounts of the light sources in the first illumination device 10A are feedback-controlled, for example. In the illumination system 20, variation in light output from the light sources in the first illumination device 10A is reduced. In the illumination system 20, furthermore, the sensor 2 in the first illumination device 10A detects a light amount of the second illumination device 1 OB that is adjacent to the first illumination device 10A among the plurality of illumination devices 10, for example. In the illumination system 20, similar to the sensor 2 in the first illumination device 10A detecting the light amounts of the light sources in the first illumination device 10A due to an instruction from the control device 21, the sensor 2 in the first illumination device 10A detects the light amount of the second illumination device 10B.

In the illumination system 20, the light amounts of the light sources in the first illumination device 10A are feedback-controlled so as to make the difference between the light amount of the second illumination device 10B and the light amount of the first illumination device 10A small. In the illumination system 20, variation in light outputs between the first illumination device 10A and the second illumination device 10B can be further reduced.

Hereinafter, the illumination system 20 according to the present embodiment will be more specifically described using FIG. 12.

In the illumination system of the comparative example, in the case where the light amounts of the light sources are feedback-controlled in each of the illumination devices, when the light output of the fourth illumination device is used as a reference, for example, whereas the light output of the fourth illumination device is 100%, there may be a case where the light output of the third illumination device is 98%. In the illumination system of the comparative example, when the light output of the fourth illumination device is used as a reference, for example, whereas the light output of the fourth illumination device is 100%, there may be a case where the light output of the second illumination device is 105%. In the illumination system of the comparative example, when the light output of the fourth illumination device is used as a reference, for example, whereas the light output of the fourth illumination device is 100%, there may be a case where the light output of the first illumination device is 97%.

In the illumination system 20 according to the present embodiment, the control device 21 instructs the third illumination device 10C and the fourth illumination device 10D to output the same light output, for example. In the illumination system 20, lighting of the light sources in the third illumination device 10C is controlled using the light output of the fourth illumination device 10D as a reference such that the light amount of the third illumination device 10C matches the light amount of the fourth illumination device 10D at the same timing.

Specifically, in the third illumination device 10C, the sensor 2 separately detects light amounts of two or more light sources having different emission colors based on an instruction from the control device 21. In the third illumination device 10C, the sensor 2 in the third illumination device 10C separately detects light amounts of two or more light sources having different emission colors in the adjacent fourth illumination device 10D based on an instruction from the control device 21. In the third illumination device 10C, the light amounts of the light sources in the fourth illumination device 10D are detected in a manner similar to that in detecting light amounts of the light sources in the third illumination device 10C. In FIG. 12, detection of a light amount of an adjacent another illumination device 10 by an illumination device 10 is illustrated by broken arrows.

In the illumination system 20, since the sensor 2 in the third illumination device 10C detects the light amount of the fourth illumination device 10D based on an instruction from the control device 21, the control device 21 can specify the emission color of the light source portion la in the fourth illumination device 10D to be detected by the sensor 2 in the third illumination device 10C. The third illumination device 10C transmits detection values of light amounts of the light sources in the third illumination device 10C detected by the sensor 2 in the third illumination device 10C to the control device 21 from the communicator 3c. The third illumination device 10C transmits detection values of light amounts of the light sources in the fourth illumination device 10D detected by the sensor 2 in the third illumination device 10C to the control device 21 from the communicator 3c.

The control device 21 computes a correction coefficient for correcting lighting of the light sources in the third illumination device 10C such that the differences between the light amounts of the light sources in the third illumination device 10C and the corresponding light amounts of the light sources in the fourth illumination device 10D respectively become small. The control device 21 transmits a detection result using the computed correction coefficient to the third illumination device 10C. The third illumination device 10C controls lighting of the light sources based on the detection result. In the illumination system 20 according to the present embodiment, as a result of performing correction such that the light amounts of the light sources in the third illumination device 10C match the corresponding light amounts of the light sources in the fourth illumination device 10D respectively, the difference in light output between the third illumination device 10C and the fourth illumination device 10D can be further reduced.

In the illumination system 20, in the case where the light output of the third illumination device 10C before correction is 98% of the light output of the fourth illumination device 10D, for example, correction is performed so as to increase the light output such that the light output of the third illumination device 10C after correction is 100%. That is, the third illumination device 10C detects the light output of the fourth illumination device 10D that emits light of the same light output based on an instruction from the control device 21 with the sensor 2 in the third illumination device 10C, and reflects the detection result on the light output of light emitted from the light sources in the third illumination device 10C.

Next, in the illumination system 20, in a manner similar to that in correcting the light output of the third illumination device 10C so as to match the light output of the fourth illumination device 10D, the light output of the second illumination device 10B is corrected so as to match the light output of the third illumination device 10C. In the illumination system 20, in the case where the light output of the second illumination device 10B before correction is 105% of the light output of the third illumination device 10C, for example, correction is performed so as to decrease the light output such that the light output of the second illumination device 10B after correction is 100%. In the illumination system 20, after the light output of the second illumination device 10B is corrected so as to match the light output of the third illumination device 10C, the light output of the first illumination device 10A is corrected so as to match the light output of the second illumination device 10B. In the illumination system 20, in the case where the light output of the first illumination device 10A before correction is 97% of the light output of the second illumination device 10B, for example, correction is performed so as to increase the light output such that the light output of the first illumination device 10A after correction is 100%. In the illumination system 20, as a result of performing correction on the light output in order from the third illumination device 10C to the first illumination device 10A, in an arrangement sequence, so as to match the light output of the adjacent illumination device 10, the light outputs of all the illumination devices 10 in the same line with the fourth illumination device 10D match the light output of the fourth illumination device 10D. In the illumination system 20, as a result of performing correction such that the light outputs of all the illumination devices 10 in the same line match, variation in light outputs of the illumination devices 10 can be further reduced.

That is, the illumination system 20 according to the present embodiment includes two or more illumination devices 10, and the external light from outside that enters from the end portion of one illumination device 10 is preferably light from another illumination device 10 adjacent to one illumination devices 10.

In the illumination system 20 of the present embodiment, by using light from adjacent another illumination device 10, variation in light outputs in the illumination devices 10 can be further reduced.

The illumination device 10 of the present embodiment is not limited to the configuration described above, and may be configured appropriately using the configurations of Embodiments 1 and 2.

Embodiment 4

Figure 15:
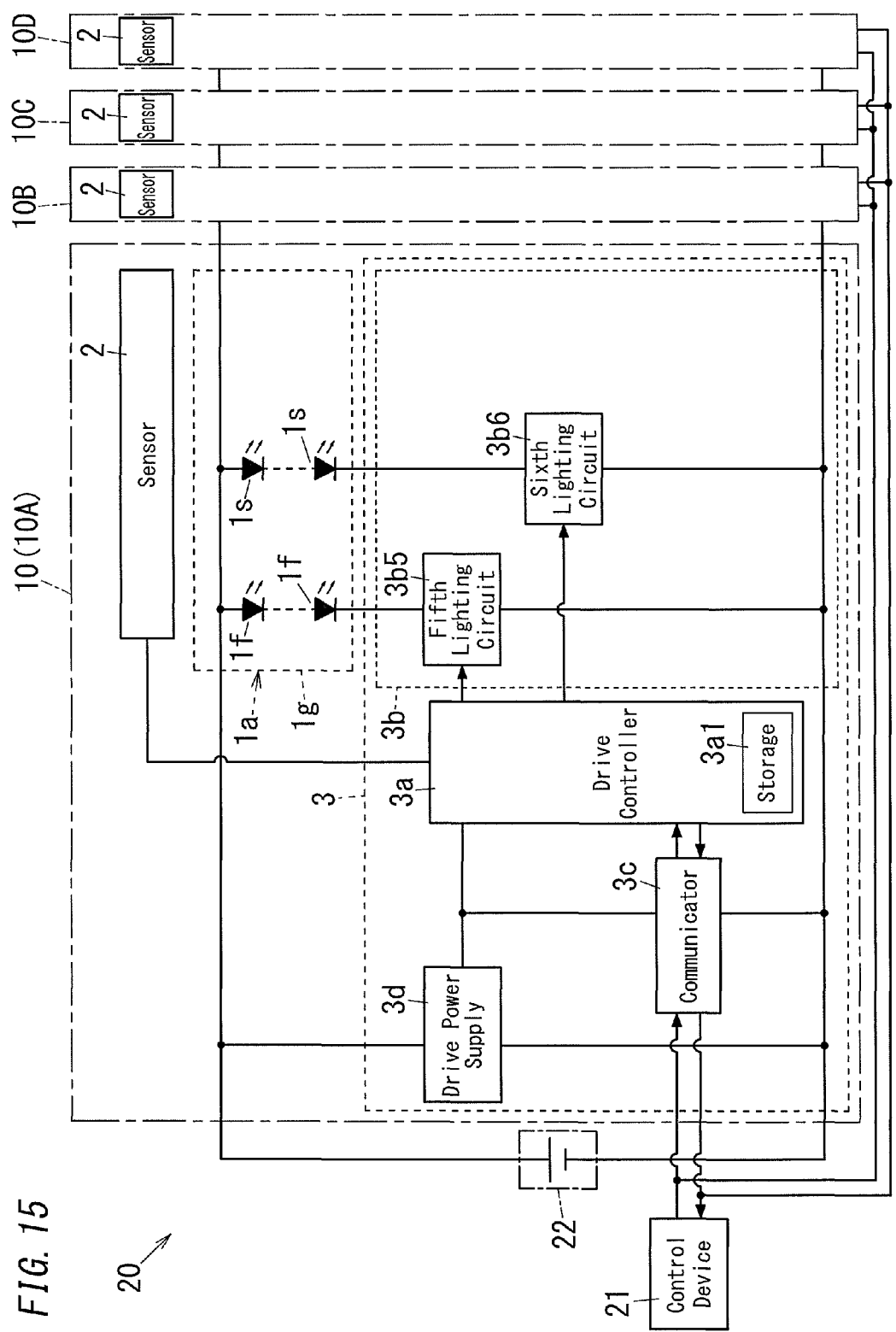
FIG. 15 is a circuit configuration diagram illustrating an illumination system according to Embodiment 4.
Figure 16:
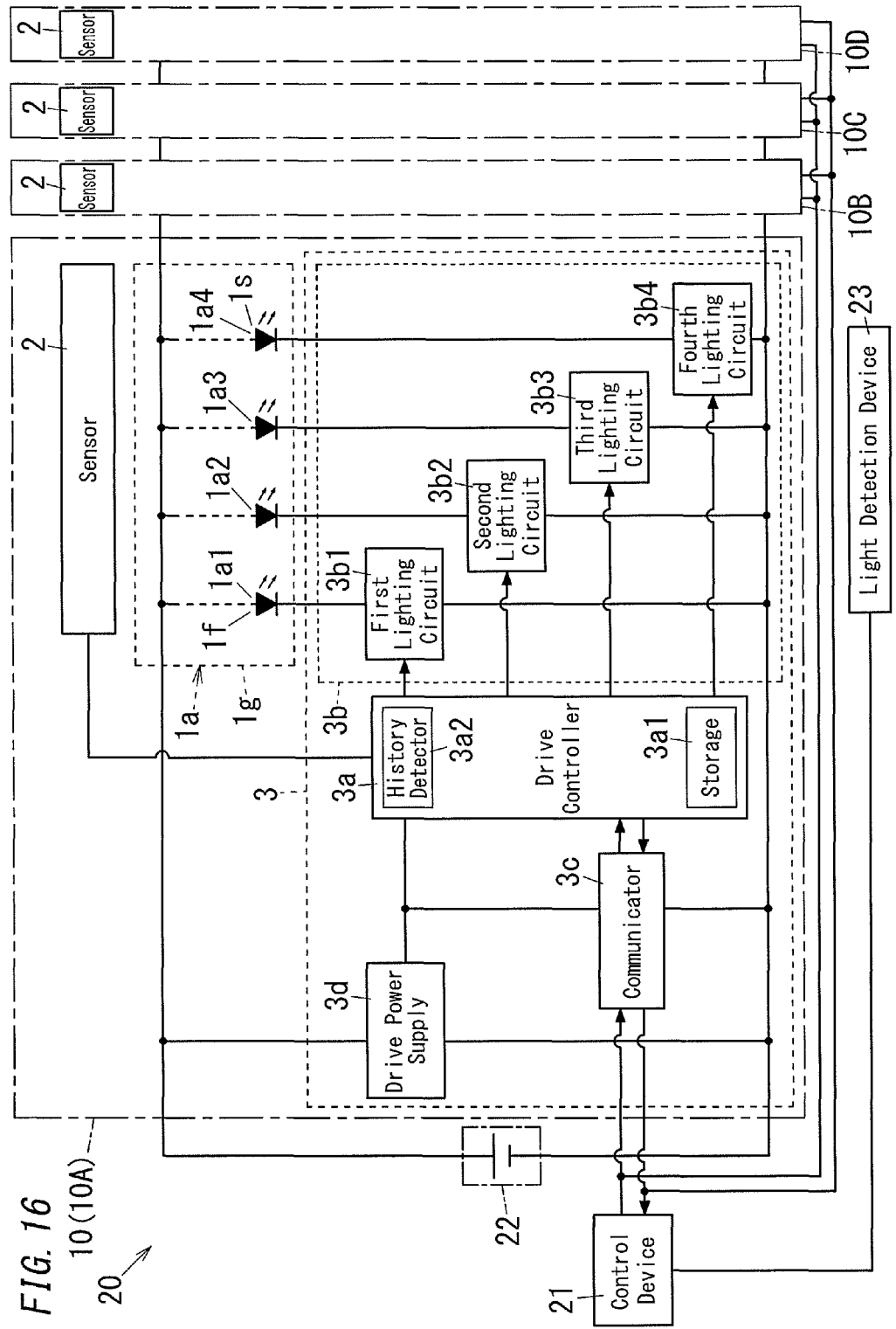
FIG. 16 is a circuit configuration diagram illustrating an illumination system according to Embodiment 5.

An illumination device 10 of the present embodiment shown in FIG. 15 mainly differs from Embodiment 1 in FIG. 1 or Embodiment 3 shown in FIG. 11 in that light sources having the same emission color are included instead of using light sources having different emission colors. Constituent elements similar to those in Embodiments 1 to 3 are provided with the same reference sign and description thereof will be omitted as appropriate.

The illumination device 10 of the present embodiment includes a light source portion 1*a*, a sensor 2, and a controller 3, as shown in FIG. 15. The sensor 2 detects a light amount of the light source portion 1*a*. The controller 3 controls lighting of the light source portion 1*a*. The light source portion 1*a* includes a plurality of first light sources 1*f* and a plurality of second light sources 1*s*. A light-emitting diode including a fluorescent material that can emit neutral white color light with one chip is used in each of the first light sources 1*f*. A light-emitting diode including a fluorescent material that can emit neutral white color light with one chip is used in each of the second light sources 1*s*. The first light source 1*f* and the second light source 1*s* emit light having the same neutral white color. The first light source 1*f* and the second light source 1s are configured such that lighting thereof is separately controlled.

The controller 3 is configured to repeat a plurality of operation cycles, one operation cycle being a set of a first period and a second period, and control lighting of the light source portion 1*a* such that composite light of light of the first light source 1*f* and light of the second light source 1*s* has the same light output over the plurality of operation cycles. The composite light of light of the first light source 1*f* and light of the second light source 1*s* has a light color of neutral white. In the first period, only either one of the first light source 1*f* or the second light source 1*s*, which is a detection target light source whose light amount is to be detected by the sensor 2, is caused to emit light. In the second period, the first light source 1*f* and the second light source 1*s* are caused to emit light. The sensor 2 outputs detection values, namely a light amount of the first light source 1*f* in the first period of a first operation cycle in the plurality of operation cycles and a light amount of the second light source 1 s in the first period of a second operation cycle in the plurality of operation cycles, the second operation cycle being different from the first operation cycle that are detected separately. The controller 3, furthermore, separately controls lighting of the first light source 1*f* and lighting of the second light source 1*s* such that the light amount of the light sources fall in respective target ranges based on the detection result. The detection result corresponds to a value corresponding to detection values detected a predetermined number of times.

In the illumination device 10 of the present embodiment, as a result of the configuration in which the controller 3 separately controls lighting of the light sources based on the detection result that corresponds to a value corresponding to detection values detected a predetermined number of times, light output variation can be further reduced.

Hereinafter, control in the illumination device 10 of the present embodiment will be described in more detail.

In the illumination device 10, the controller 3 separately controls lighting of the first light source 1f and the second light source 1s having the same emission color, based on a duty ratio of a PWM signal. A fifth lighting circuit 3b5 in controller 3 causes only the first light source if to emit light in the first period while maintaining a predetermined duty ratio in one operation cycle of the PWM signal. A sixth lighting circuit 3b6 in the controller 3 performs control such that a timing at which the second light source 1s is caused to start emission while maintaining the duty ratio in one operation cycle of the PWM signal is shifted from the timing at which the first light source 1f is caused to start light emission.

The illumination device 10 of the present embodiment detects the light amount of the first light source 1f one time in the first period in one operation cycle in which the light amount of the first light source 1f is to be detected, and controls lighting of the light source portion 1a using an integrated value in which detection values detected in the first periods in a successive plurality of operation cycles are integrated as the detection result. The illumination device 10 detects the light amount of the second light source 1s one time in the first period in one operation cycle in which the light amount of the second light source 1s is to be detected, and controls lighting of the light source portion 1a using an integrated value in which detection values detected in the first periods in a successive plurality of operation cycles are integrated as the detection result.

In the illumination device 10 of the present embodiment, the sensor 2 performs light amount detection of the light source portion 1a in order of the first light source 1f and the second light source 1s, and detection values detected a predetermined number of times are integrated, and as a result, a configuration in which variation in light outputs is further reduced can be obtained.

Incidentally, in an illumination device of a comparative example in which feedback control of light amounts of light sources are not performed, the light outputs from a first light source and a second light source that are driven by separate drive circuits may differ due to time degradation. In the illumination device of the comparative example, if variation exists in light outputs from the first light source and the second light source that correspond to the respective drive circuits, brightness unevenness may occur between the first light source and the second light source.

In the illumination device 10 of the present embodiment, feedback control of light amounts of light sources is separately performed on the drive circuit that drives the first light source if and on the drive circuit that drives the second light source 1s, and as a result, the brightness unevenness can be reduced.

The light source is not limited to a light-emitting diode that can emit neutral white color light. The light source may be a light-emitting diode that can emit daylight color light, a light-emitting diode that can emit white light, a light-emitting diode that can emit warm white light, or a light-emitting diode that can emit light bulb color light, which are standardized in JIS Z 9112. The light source is not limited to the light-emitting diode standardized in JIS Z 9112, and the light source may be a light-emitting diode that can emit light having a light color standardized in ANSI C78.377.

The illumination device 10 of the present embodiment may be configured appropriately using the configurations of the illumination device 10 in Embodiments 1 to 3. The illumination device 10 of the present embodiment can be applied to an illumination system 20 and a mobile body 30, similar to Embodiment 1.

Embodiment 5

An illumination system 20 of the present embodiment mainly differs from that in Embodiment 3 shown in FIG. 12 in that variation in light outputs of a plurality of illumination devices 10 is reduced using a light detection device 23 instead of using light detection with a sensor 2 in an adjacent another illumination device 10. The illumination system 20 of the present embodiment is configured using an illumination device 10 similar to that in Embodiment 1. Constituent elements similar to those in Embodiments 1 and 3 are provided with the same reference sign and description thereof will be omitted as appropriate.

The illumination system 20 of the present embodiment includes two or more illumination devices 10, as shown in FIGS. 16, 17A, 17B, and 17C. The illumination system 20 includes the light detection device 23. The light detection device 23 is provided separately to the two or more illumination devices 10. The light detection device 23 is configured to detect light amounts of the two or more illumination devices 10. The light detection device 23 is configured to transmit a detection value based on detected light amounts to a control device 21 on the request from the control device 21.

In the illumination system 20 of the present embodiment, the light detection device 23 transmits a detection value based on detected light amounts to the control device 21 on the request from the control device 21, and as a result, the light amount of a detection target illumination device 10 can be detected. As a result of detecting the light amount of the detection target illumination device 10, the illumination system 20 can specify an illumination device 10 that cannot output light with a predetermined light amount, and the result can be used to replace the specified illumination device 10. In the illumination system 20, light amounts of a plurality of illumination devices 10 are detected, and the detection result is used to perform correction such that the light amounts of the illumination devices 10 are made the same, and as a result, variation in light outputs in the plurality of illumination devices 10 can be reduced.

In the illumination system 20 of the present embodiment, the control device 21 is electrically connected to the plurality of illumination devices 10. The light detection device 23 is configured to be electrically connected to the control device 21. The light detection device 23 is configured to detect a light output of an illumination device 10 based on an instruction from the control device 21. The control device 21 is configured to acquire a detection value that is light amounts of light sources in a detection target illumination device 10 detected by the light detection device 23.

Figure 17A:
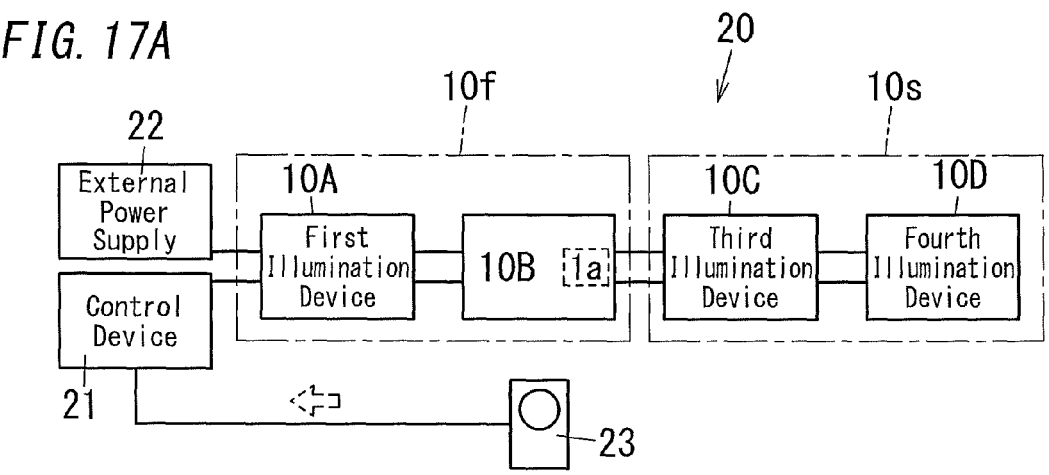
FIGS. 17A-17C are block diagrams illustrating the illumination system of Embodiment 5.

As shown in FIG. 17A, the control device 21 is configured to acquire a detection value that is light amounts of the light sources in the light source portion 1a in a second illumination device 10B detected by the light detection device 23, for example. In FIG. 17A, the detection value data that is transmitted from the light detection device 23 to the control device 21 is illustrated by a broken-outline arrow.

Figure 17B:
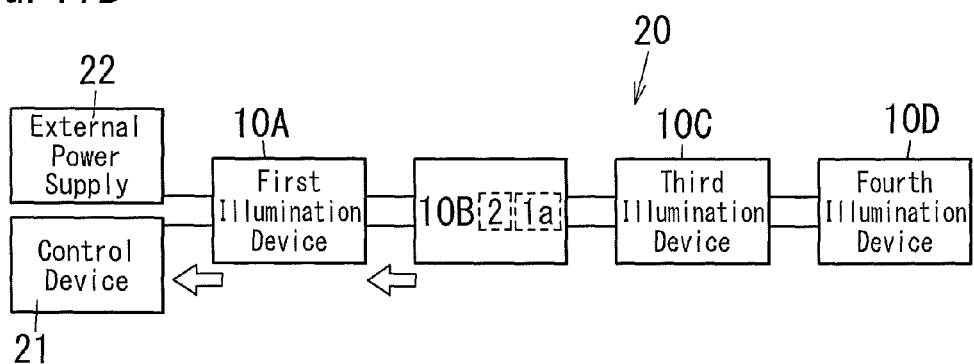

As shown in FIG. 17B, the control device 21 is configured to acquire a detection value that is light amounts of the light sources in the light source portion 1a in the second illumination device 10B detected by the sensor 2 in the second illumination device 10B, for example. In FIG. 17B, the detection value data that is transmitted from the second illumination device 10B to the control device 21 is illustrated by an outline arrow.

Figure 17C:
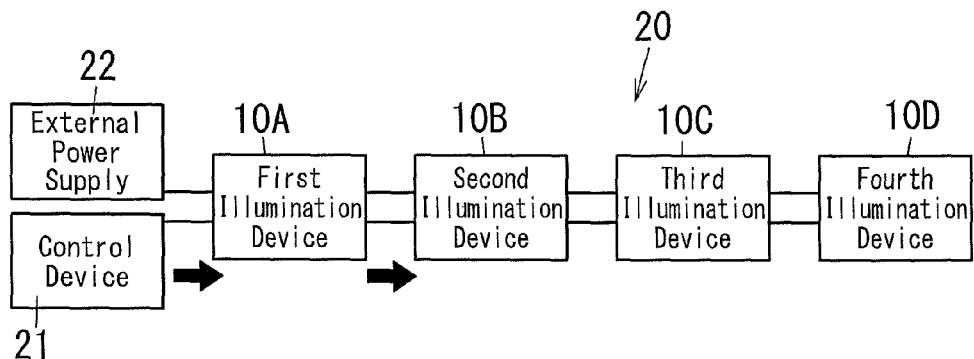

As shown in FIG. 17C, the control device 21 is configured to transmit correction data for controlling lighting of the light sources in the second illumination device 10B based on the detection value detected by the light detection device 23 and the detection value detected by the sensor 2 in the second illumination device 10B, for example. In FIG. 17C, correction data that is transmitted from the control device 21 to the second illumination device 10B is illustrated by a black arrow. The second illumination device 10B controls lighting of the light sources in the second illumination device 10B based on the correction data.

In the illumination system 20 of the present embodiment, with respect to a first illumination device 10A, a third illumination device 10C, and a fourth illumination device 10D as well, the light detection device 23 detects a light amount of a detection target illumination device 10, similar to the second illumination device 10B. In the illumination system 20, the light detection device 23 detects the light amount of a detection target illumination device 10 and the illumination device 10 is controlled, and as a result, the illumination devices 10 can be controlled such that variation in light output in the detection target illumination devices 10 is reduced.

That is, in the illumination system 20 of the present embodiment, the control device 21 is electrically connected to the plurality of illumination devices 10. The control device 21 controls a detection target illumination device 10 based on light amounts of two or more illumination devices 10 detected by the light detection device 23 and light amounts detected by the sensors 2 in the two or more illumination devices 10. The control device 21 preferably controls the detection target illumination device 10 of the two or more illumination devices such that the light amount of the detection target illumination device 10 falls in a predetermined range.

In the illumination system 20 of the present embodiment, variation in light outputs in the illumination devices 10 can be reduced with a configuration in which the control device 21 controls the detection target illumination device 10 based on a light amount of the illumination device 10 detected by the light detection device 23 and a light amount detected by the sensor 2 in the illumination device 10.

In the illumination system 20 of the present embodiment, the light detection device 23 is configured to be appropriately arranged so as to detect a light amount of a target illumination device 10. The light detection device 23 is configured to detect light amounts of light sources in synchronization with the lighting of the light sources in the target illumination device 10, based on an instruction from the control device 21. In the illumination system 20, the light detection device 23 may not be electrically connected to the control device 21 when the light detection device 23 is not used.

The light detection device 23 may have a configuration in which a color sensor, an illuminance sensor, a spectroscope, or the like is used. The color sensor is configured such that color filters are combined to photodiodes, and can detect a light output having a predetermined color tone. The illuminance sensor is configured to include a phototransistor or a photodiode, and can detect a light output. A prism spectroscope, a grating spectroscope using a diffraction grating, or an interference spectroscope using an interference fringe, for example, can be used as the spectroscope.

The control device 21 is configured to transmit, to the illumination device 10, correction data including a correction coefficient for correction for causing light sources to output respective predetermined light amounts. In the illumination system 20, according to the configuration in which the control device 21 transmits the correction data to the illumination device 10, variation in light outputs in adjacent illumination devices 10 can be reduced using the light detection device 23.

Next, operations of the illumination system 20 of the present embodiment will be described.

The illumination system 20 of the present embodiment is configured such that a drive controller 3a can correct a control signal for controlling a lighting circuit 3b so as not to generate variation in light outputs from the plurality of illumination devices 10. In the illumination device 10, lighting of each of the light sources is corrected such that variation in light outputs from the plurality of illumination devices 10 is reduced using the light detection device 23. Correction is performed by comparing the light amount of the illumination device 10 based on light amounts of light sources detected by the sensor 2 and the light amount measured by the light detection device 23, for example. The control device 21 computes a correction coefficient for making the light amounts of the light sources detected by the sensor 2 to match the light amount detected by the light detection device 23. In the illumination device 10, the correction coefficient computed by the control device 21 is stored in the storage 3a1 in the drive controller 3a. A computer in the control device 21 connected to the light detection device 23 and the sensor 2 in an illumination device 10 may be caused to compute the correction coefficient. Computation of the correction coefficient is not limited to the configuration in which the correction coefficient is computed in the control device 21, and the correction coefficient may be computed in the light detection device 23.

Incidentally, in the illumination system, in the case where a specific illumination device cannot output a predetermined light output due to a failure of the illumination device, time degradation of a light source in the illumination device, or time degradation of the sensor in the illumination device, only a specific illumination device may be replaced among the plurality of illumination devices.

In the illumination system in the comparative example, even if the same light modulation signal is transmitted from the control device, the light outputs of one or more illumination devices that have been replaced among the plurality of illumination devices may be greatly different from the light outputs of one or more illumination devices that have not been replaced. In the illumination system, the light outputs of the plurality of illumination devices in a similar degradation environment tend to greatly differs from the light output of the illumination device that is in a different degradation environment.

In the illumination system in the comparative example, the plurality of illumination devices are sorted into two or more illumination groups, namely a group of one or more new illumination devices that have been replaced, and a group of one or more old illumination devices that have not been replaced.

In the illumination system 20 of the present embodiment, only the first illumination device 10A and the second illumination device 10B may be replaced, as shown in FIG. 17A, for example. In the illumination system 20, the third illumination device 10C and the fourth illumination device 10D that have not been replaced constitute a first illumination group 10f, and the first illumination device 10A and the second illumination device 10B that have been replaced constitute a second illumination group 10s.

In the illumination system 20 of the present embodiment, the control device 21 sorts the illumination devices into the first illumination group 10f and the second illumination group 10s. In the illumination system 20, instead of detecting light amounts of a plurality of illumination devices 10, only a light amount of the second illumination device 10B in the first illumination group 10f and a light amount of the third illumination device 10C in the second illumination group 10s are detected, for example. The control device 21 computes the correction data for making variation in light outputs of the illumination devices 10 smaller based on the light amount of the second illumination device 10B in the first illumination group 10f and the light amount of the third illumination device 10C in the second illumination group 10s. The control device 21 transmits the correction data to the first illumination group 10f to which the second illumination device 10B to be corrected belongs. In the illumination system 20, lighting of the first illumination device 10A and the second illumination device 10B that belong to the first illumination group 10f is controlled based on the correction data.

In other words, in the illumination system 20 of the present embodiment, the control device 21 sorts two or more illumination devices 10 into two or more illumination groups. The control device 21 preferably transmits, for each of the two or more illumination groups, the correction data based on the detected light amount of an illumination device 10 belonging to the illumination group that has been measured by the light detection device 23 and the light amount detected by the sensor 2 in the illumination device 10 to the illumination group.

In the illumination system 20 of the present embodiment, according to the configuration in which the control device 21 transmits the correction data to each of the illumination groups, variation in light outputs of the plurality of illumination devices 10 can be reduced in a relatively simple manner.

In the illumination system 20, the control device 21 can sort the illumination devices 10 into illumination groups with reference to history stored in a history detector 3a2 provided in each of the drive controllers 3a, for example. The history detector 3a2 can be configured by a timer-counter. The illumination device 10 is configured to transmit an address of the illumination device 10 and a count value counted in the history detector 3a2 to the control device 21 from the communicator 3c. The control device 21 may sort the illumination devices 10 into illumination groups such that, in each illumination group, count values in the history detectors 3a2 since the illumination devices 10 are mounted are in a predetermined range. The control device 21 can manage replacement information history of each of the illumination devices 10 with respect to whether the illumination device 10 is a new illumination device 10 that has been replaced, or the illumination device 10 is an old illumination device 10 that has not been replaced. In the illumination system 20, the control device 21 can also sort the plurality of illumination devices 10 into illumination groups, with polling processing in which communication is regularly performed with the plurality of illumination devices 10, such that an illumination device 10 to which communication cannot be performed is regarded as an illumination device 10 that has been replaced. The illumination system 20 may have a configuration in which the control device 21 includes the history detector 3a2 in the case of performing the polling processing.

In other words, in the illumination system 20 of the present embodiment, the control device 21 preferably sorts a plurality of illumination devices 10 into two or more illumination groups based on information in the history detector 3a2 that detects an illumination device 10 that has been replaced among the plurality of illumination devices 10.

The control device 21, as a result of performing sorting of a plurality of illumination devices 10 into two or more illumination groups based on information in the history detector 3a2 that detects an illumination device 10 that has been replaced among the plurality of illumination devices 10, can make variation in light outputs in the illumination devices 10 smaller in a relatively simple manner.

Note that, in the illumination system 20, in the case where the light amount in an illumination device 10 is not detected by the sensor 2, the correction coefficient can also be obtained based on the detection value by the light detection device 23 and target light amounts corresponding to currents that are caused to flow in light sources in the illumination device 10, and is reflected in control of the light source. The illumination system 20, even in a case where feedback control on the light amounts of light sources using the sensor 2 is not performed, can detect variation in light outputs of a plurality of illumination devices 10 using the light detection device 23, and make the variation in light outputs of the plurality of illumination devices 10 smaller. The illumination system 20 may be configured such that replacement information of an illumination device 10 is displayed using the history detector 3a2. In an illumination device 10, replacement information of the illumination device 10 may be displayed by blinking in the light source portion 1a or the like. In the illumination system 20, even in a configuration in which a plurality of illumination devices 10 each include only one type of light source, for example, the controller 3 can control a light source based on a detection result such that variation in light outputs of light sources in the illumination devices 10 is reduced.

The illumination device 10 of the present embodiment is not limited to the configuration described above, and may be configured by appropriately using the configurations in Embodiments 1 to 4.

Aspects according to the present disclosure

As is apparent from Embodiments 1 to 5 described above, an illumination device (10) according to a first aspect of the present disclosure includes a light source portion (1a), a sensor (2), and a controller (3). The sensor (2) is configured to detect a light amount of the light source portion (1a). The controller (3) is configured to control lighting of the light source portion (1a). The light source portion (1a) includes a first light source (1f) and a second light source (1s). The controller (3) is configured to repeat a plurality of operation cycles, one operation cycle being a set of a first period and a second period. The controller is configured to control lighting of the light source portion (1a) such that composite light generated by light from the first light source (1f) and light from the second light source (1s) has the same light output over the plurality of operation cycles. In the first period, only either one of the first light source (1f) or the second light source (1s), which is a detection target light source whose light amount is to be detected by the sensor (2), is caused to emit light. In the second period, the first light source (1f) and the second light source (1s) are caused to emit light. The sensor (2) is configured to output detection values of a light amount of the first light source (1f) in the first period of a first operation cycle in the plurality of operation cycles and a light amount of the second light source (1s) in the first period of a second operation cycle in the plurality of operation cycles, the second operation cycle being different from the first operation cycle that are separately detected. The controller (3) is further configured to separately control lighting of the first light source (1f) and lighting of the second light source (1s) such that a light amount of the detection target light source fall in a target range based on a detection result. The detection result corresponds to a value corresponding to the detection values of the light amount detected a predetermined number of times.

In the illumination device (10) according to the first aspect of the present disclosure, the controller (3) is configured to separately control lighting of light sources based on a detection result having a value corresponding to detection values detected a predetermined number of times, and as a result, a configuration is realized in which variation in light output can be further reduced.

In an illumination device (10) according to a second aspect of the present disclosure, in the first aspect, the light source portion (1a) includes two or more types of light sources having different emission colors from each other. The two or more types of light sources include at least the first light source (1f) and the second light source (1s). The first period is a single color period in which only one type of light source among the two or more types of light sources is caused to emit light. The second period is a mixed color period in which the two or more types of light sources are caused to emit light. The controller (3) is configured to control lighting of the two or more types of light sources such that mixed color light is the same light color in the plurality of operation cycles. The mixed color light is made of light from each of the two or more types of light sources. The sensor (2) is configured to output a detection value of a detected light amount of the one type of light source in the single color period. The controller (3) is configured to separately control lighting of the two or more types of light sources such that a light amount of the light detection target source fall is in the target range based on the detection result.

In the illumination device (10) according to the second aspect of the present disclosure, the controller (3) is configured to separately control lighting of light sources based on a detection result having a value corresponding to detection values detected a predetermined number of times, and as a result, variation in color can be reduced.

In an illumination device (10) according to a third aspect of the present disclosure, in the first or second aspect, the controller (3) is configured to perform phase shift control. In the phase shift control, a phase corresponding to a second timing is shifted so as to be after a phase corresponding to a first timing in the one operation cycle. Only the detection target light source on which the sensor (2) is to perform detection is caused to start light emission at the first timing. The remaining light source or sources are caused to start light emission at the second timing.

In the illumination device (10) according to the third aspect of the present disclosure, the total light amount in each one operation cycle can be maintained with a relatively simple configuration in which phase shift control is performed.

In an illumination device (10) according to a fourth aspect of the present disclosure, in the third aspect, the controller (3) is configured to gradually increase a volume of the phase shift over two or more operation cycles in the plurality of operation cycles.

In the illumination device (10) according to the fourth aspect of the present disclosure, the controller (3) is configured to gradually increase a volume of the phase shift, and as a result, flickering of light that is emitted from the illumination device 10 can be suppressed compared with a configuration in which control is performed such that the phase difference is the same.

In an illumination device (10) according to a fifth aspect of the present disclosure, in the fourth aspect, the sensor (2) is configured to detect the light amount of the detection target light source in the first period in an operation cycle in which the volume of the phase shift is largest in the two or more operation cycles.

In the illumination device (10) according to the fifth aspect of the present disclosure, the sensor (2) is configured to detect the light amount of the light source in the first period in one operation cycle in which the volume of the phase shift is the largest in the two or more operation cycles, and as a result, detection sensitivity can be easily further increased.

In an illumination device (10) according to a sixth aspect of the present disclosure, in any one of the first to fifth aspects, the sensor (2) is configured to not detect a light amount of the detection target light source, in a case where a lighting period of the detection target light source in the first period is shorter than a preset detection time for detecting the light amount.

In the illumination device (10) according to the sixth aspect of the present disclosure, detection sensitivity can be easily further increased.

An illumination device (10) according to a seventh aspect of the present disclosure, in any one of the first to sixth aspects, includes a casing (4) that has an elongated shape. The casing (4) houses the light source portion (1a), the sensor (2), and the controller (3). The casing (4) is configured such that external light from outside enters inside from an end portion in a longitudinal direction. The sensor (2) is configured to detect a light amount of the external light from outside that enters from the end portion. The controller (3) is configured to control lighting of the detection target light source such that a light amount of the light source falls in the target range based on a detection result corresponding to a detection value of the light amount of the detection target light source detected by the sensor (2), and a detection value of a light amount of the external light detected by the sensor (2).

In the illumination device (10) according to the seventh aspect of the present disclosure, variation in light amount of the illumination device (10) can be further reduced with a relatively simple configuration in which the sensor (2) detects a light amount of the external light from outside that enters from the end portion.

In an illumination device (10) according to an eighth aspect of the present disclosure, in the seventh aspect, the casing (4) includes a light receiving path (2c5) configured to guide the external light from the end portion to the sensor (2).

In the illumination device (10) according to the eighth aspect of the present disclosure, the sensor (2) can accurately detect the external light from outside that enters from the end portion according to a configuration including the light receiving path (2c5).

An illumination system (20) according to a ninth aspect of the present disclosure includes at least one illumination devices (10) according to the first to eighth aspects, and a control device (21) configured to control driving of the illumination device (10). The at least one illumination device (10) further includes a communicator (3c) configured to communicate with the control device (21). The communicator (3c) is configured to transmit the detection values to the control device (21) on a request from the control device (21).

In the illumination system (20) according to the ninth aspect of the present disclosure, the communicator (3c) transmits the detection values to the control device (21) on a request from the control device (21), and as a result, a configuration including the illumination device in which variation in light output is further reduced can be realized.

In an illumination system (20) according to a tenth aspect of the present disclosure, in the ninth aspect, the communicator (3c) is configured to perform transmission of the detection values, after lighting of the light source portion (1a) for a predetermined period.

In the illumination system (20) according to the tenth aspect of the present disclosure, the communicator (3c) performs transmission of the detection values, after lighting of the light source portion (1a) for a predetermined period, and as a result, the sensor (2) can perform detection at a time when lighting of the light source portion (1a) becomes stable.

An illumination system (20) according to an eleventh aspect of the present disclosure includes two or more of the illumination devices (10) according to the seventh or eighth aspect, the external light from outside that enters from the end portion of one illumination device being light from another illumination device (10) adjacent to the one illumination devices (10).

In the illumination system (20) according to the eleventh aspect of the present disclosure, variation in light outputs of the illumination devices (10) can be reduced by using light from adjacent another illumination device (10).

An illumination system (20) according to a twelfth aspect of the present disclosure further includes, in the ninth or tenth aspect, a light detection device (23). The at least one illumination device (10) includes two or more illumination devices (10). The light detection device (23) is separated from each of the two or more illumination devices (10). The light detection device (23) is configured to detect light amounts of the two or more illumination devices (10). The light detection device (23) is configured to transmit the detection values based on detected light amounts to the control device (21) on the request from the control device (21).

In the illumination system (20) according to the twelfth aspect of the present disclosure, the light detection device (23) transmits the detection values based on detected light amounts to the control device (21) on request from the control device (21), and as a result, the light amount of a detection target illumination device (10) can be detected.

In an illumination system (20) according to a thirteenth aspect of the present disclosure, in the twelfth aspect, the control device (21) is electrically connected to each of the two or more illumination devices (10). The control device (21) is configured to control a detection target illumination device (10) detected by the light detection device (23), based on light amounts of the two or more illumination devices (10) detected by the light detection device (23), and light amounts detected by the sensor (2) in each of the two or more illumination devices (10). The control device (21) is configured to control the detection target illumination device (10) of the two or more illumination devices (10) such that a light amount from the detection target illumination device (10) falls in a predetermined range.

In the illumination system (20) according to the thirteenth aspect of the present disclosure, the control device (21) is configured to control the detection target illumination device (10) such that a light amount from the detection target illumination device (10) is in a predetermined range, and as a result, variation in light outputs of the illumination devices (10) can be reduced by using light from adjacent another illumination device (10).

In an illumination system (20) according to a fourteenth aspect of the present disclosure, in the twelfth or thirteenth aspect, the control device (21) is configured to sort the two or more illumination devices (10) into two or more illumination groups. The control device (21) is configured to, in each of the two or more illumination groups, transmit correction data to an illumination group based on the light amount detected on an illumination device (10) belonging to the illumination group, the light amount being measured by the light detection device (23), and the light amount detected by the sensor (2) in the illumination device (10).

In the illumination system (20) according to the fourteenth aspect of the present disclosure, correction data is transmitted to each of two or more illumination groups, and as a result, variation in light outputs of the illumination groups can be relatively easily reduced.

In an illumination system (20) according to a fifteenth aspect of the present disclosure, in the fourteenth aspect, the control device (21) is configured to sort the two or more illumination groups based on information from a history detector (3a2) configured to detect an illumination device (10) that has been replaced among the two or more illumination devices (10).

In the illumination system (20) according to the fifteenth aspect of the present disclosure, sorting of the two or more illumination groups is performed based on information of a history detector (3a2), and as a result, variation in light outputs of the illumination devices (10) can be relatively easily reduced.

A mobile body (30) according to a sixteenth aspect of the present disclosure includes the illumination system (20) according to any one of the ninth to fifteenth aspects and a body to which the illumination system (20) is mounted.

The mobile body (30) according to the sixteenth aspect of the present disclosure can have a configuration in which the illumination system (20) having a smaller variation in light output is mounted.

In A method according to the seventeenth aspect of the present disclosure, causing only one light source, as a target light source, to emit light in a first period, the one light source being selected from light sources; causing all of the light sources to emit light in a second period subsequent to the first period; detecting, by a sensor (2), a light amount of the target light source in the first period; repeating an operation cycle plural times, the operation cycle being a set of the first period and the second period, wherein the target light source in one operation cycle is different from the target light source in an immediately subsequent operation cycle; controlling one or more of the light sources such that composite light generated by light from the light sources has a same light output over a plurality of operation cycles; and controlling the target light source such that a light amount of the target light source falls in a target range, based on multiple detection results of the light amount of the target light source detected by the sensor (2).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An illumination device comprising:
   a light source portion;
   a sensor configured to detect a light amount of the light source portion; and
   a controller configured to control lighting of the light source portion,
   the light source portion including a first light source and a second light source,
   the controller being configured to repeat a plurality of operation cycles, one operation cycle being a set of a first period in which only either one of the first light source or the second light source, which is a detection target light source whose light amount is to be detected by the sensor, is caused to emit light and a second period in which the first light source and the second light source are caused to emit light, the controller being configured to control the lighting of the light source portion such that composite light generated by light from the first light source and light from the second light source has a same light output over the plurality of operation cycles,
   the sensor being configured to output detection values of a light amount of the first light source in the first period of a first operation cycle in the plurality of operation cycles and a light amount of the second light source in the first period of a second operation cycle in the plurality of operation cycles, the second operation cycle being different from the first operation cycle that are separately detected, and
   the controller being further configured to separately control lighting of the first light source and lighting of the second light source such that a light amount of the detection target light source falls in a target range based on a detection result that corresponds to a value corresponding to the detection values of the light amount detected a predetermined number of times.

2. The illumination device according to claim 1, wherein
   the light source portion includes two or more types of light sources having different emission colors from each other, the two or more types of light sources including at least the first light source and the second light source,
   the first period is a single color period in which only one type of light source among the two or more types of light sources is caused to emit light,
   the second period is a mixed color period in which the two or more types of light sources are caused to emit light,
   the controller is configured to control lighting of the two or more types of light sources such that mixed color light, which is made of light from each of the two or more types of light sources, is a same light color in the plurality of operation cycles,
   the sensor is configured to output a detection value of a detected light amount of the one type of light source in the single color period, and
   the controller is configured to separately control lighting of the two or more types of light sources such that the light amount of the detection target light source fall in the target range based on the detection result.

3. The illumination device according to claim 1, wherein the controller is configured to cause only the detection target light source on which the sensor is to perform detection to start light emission at a first timing, to cause a remaining light source or sources to start light emission at a second timing, and to perform phase shift in which a phase corresponding to the second timing is shifted so as to be after a phase corresponding to the first timing in the one operation cycle.

4. The illumination device according to claim 3, wherein the controller is configured to gradually increase a volume of the phase shift over two or more operation cycles in the plurality of operation cycles.

5. The illumination device according to claim 4, wherein the sensor is configured to detect the light amount of the detection target light source in the first period in an operation cycle in which the volume of the phase shift is largest in the two or more operation cycles.

6. The illumination device according to claim 1, wherein the sensor is configured to not detect the light amount of the detection target light source, in a case where a lighting period of the detection target light source in the first period is shorter than a preset detection time for detecting the light amount.

7. The illumination device according to claim 1, further comprising a casing that has an elongated shape, wherein
   the casing houses the light source portion, the sensor, and the controller,
   the casing is configured such that external light from outside enters inside from an end portion in a longitudinal direction,
   the sensor is configured to detect a light amount of the external light from outside that enters from the end portion, and
   the controller is configured to control lighting of the detection target light source such that the light amount of the detection target light source falls in the target range based on a detection result corresponding to a detection value of the light amount of the detection target light source detected by the sensor , and a detection value of a light amount of the external light detected by the sensor.

8. The illumination device according to claim 7, wherein the casing includes a light receiving path configured to guide the external light from the end portion to the sensor.

9. An illumination system comprising:
   at least one illumination device according to claim 1; and
   a control device configured to control driving of the illumination device,
   the at least one illumination device further including a communicator configured to communicate with the control device, and
   the communicator being configured to transmit the detection values to the control device on a request from the control device.

10. The illumination system according to claim 9, wherein the communicator is configured to perform transmission of the detection values, after lighting of the light source portion for a predetermined period.

11. An illumination system comprising two or more illumination devices according to claim 7,
    the external light from outside that enters from the end portion of one illumination device being light from another illumination device adjacent to the one illumination device.

12. The illumination system according to claim 9, further comprising a light detection device, wherein:
    two or more illumination devices are included,
    the light detection device is separated from each of the two or more illumination devices and is configured to detect light amounts of the two or more illumination devices, and the light detection device is configured to transmit the detection values based on detected light amounts to the control device on the request from the control device.

13. The illumination system according to claim 12, wherein the control device is electrically connected to each of the two or more illumination devices, and is configured to control a detection target illumination device detected by the light detection device such that the light amount from the detection target illumination device falls in a predetermined range, based on light amounts of the two or more illumination devices detected by the light detection device, and light amounts detected by the sensor in each of the two or more illumination devices.

14. The illumination system according to claim 12, wherein the control device is configured to sort the two or more illumination devices into two or more illumination groups, and the control device is configured to, in each of the two or more illumination groups, transmit correction data to an illumination group based on the light amount detected on an illumination device belonging to the illumination group, the light amount being measured by the light detection device, and the light amount detected by the sensor in the illumination device.

15. The illumination system according to claim 14, wherein the control device is configured to sort the two or more illumination groups based on information from a history detector configured to detect an illumination device that has been replaced among the two or more illumination devices.

16. A mobile body comprising:
the illumination system according to claim 9; and
a body to which the illumination system is mounted.

* * * * *